US006353468B1

(12) United States Patent
Howard et al.

(10) Patent No.: US 6,353,468 B1
(45) Date of Patent: Mar. 5, 2002

(54) APPARATUS AND METHOD FOR PRESENTING APPARENT MOTION VISUAL DISPLAYS

(76) Inventors: Laura B. Howard, 6209 Glen Oak, Los Angeles, CA (US) 90068; Charles J. Fletcher-Watson, 8480 Harold Way, Los Angeles, CA (US) 90069

( * ) Notice: Subject to any disclaimer, the term of this patent is extended or adjusted under 35 U.S.C. 154(b) by 0 days.

(21) Appl. No.: 09/230,313

(22) PCT Filed: Jul. 23, 1997

(86) PCT No.: PCT/US97/13372

§ 371 Date: Oct. 21, 1999

§ 102(e) Date: Oct. 21, 1999

(87) PCT Pub. No.: WO98/03956

PCT Pub. Date: Jan. 29, 1998

Related U.S. Application Data

(60) Provisional application No. 60/022,315, filed on Jul. 23, 1996.

(51) Int. Cl.[7] .......... G03B 25/00
(52) U.S. Cl. .......... 352/100
(58) Field of Search .......... 352/100, 98, 40, 352/133, 200, 87; 40/442, 902

(56) References Cited

U.S. PATENT DOCUMENTS

| | | | | | |
|---|---|---|---|---|---|
| 721,718 | A | | 3/1903 | Meikle | 352/100 |
| 742,632 | A | | 10/1903 | Hadden | 352/100 |
| 917,587 | A | | 4/1909 | Good | 352/100 |
| 978,854 | A | | 12/1910 | Czerniewski | 352/100 |
| 2,026,753 | A | | 1/1936 | Rosenthal et al. | 352/100 |
| 2,299,731 | A | | 10/1942 | Arendt | 40/442 |
| 2,319,287 | A | | 5/1943 | Arendt | 352/100 |
| 2,833,176 | A | | 5/1958 | Ossoinak | 352/81 |
| 3,653,753 | A | | 4/1972 | Mitchell | 352/100 |
| 3,694,062 | A | | 9/1972 | Koenig | 352/100 |
| 3,704,064 | A | | 11/1972 | Sollogoub et al. | 352/100 |
| 3,743,394 | A | * | 7/1973 | Meszlenyl | 352/100 |
| 3,951,529 | A | | 4/1976 | Gandia | 352/100 |
| 4,179,198 | A | | 12/1979 | Brachet et al. | 352/100 |
| 4,383,742 | A | | 5/1983 | Brachet et al. | 352/100 |
| 4,470,044 | A | * | 9/1984 | Bell | 340/755 |
| 5,108,171 | A | | 4/1992 | Spaulding | 352/100 |
| 5,650,794 | A | * | 7/1997 | Walsh | 345/56 |
| 6,016,183 | A | * | 1/2000 | Yamamoto | 352/100 |

FOREIGN PATENT DOCUMENTS

| | | |
|---|---|---|
| DE | 31 05 820 A1 | 8/1982 |
| GB | 2 241 813 A | 9/1991 |
| GB | 2254930 | 10/1992 |
| JP | 2-103089 | 4/1990 |
| WO | WO 94/07233 | 3/1994 |

* cited by examiner

*Primary Examiner*—Russell Adams
*Assistant Examiner*—Rodney Fuller
(74) *Attorney, Agent, or Firm*—Christie, Parker & Hale, LLP

(57) ABSTRACT

A system for providing visual art, entertainment and advertising in subway tunnels. The system illuminated brings into view successive pieces of artwork displayed within the tunnel such that passengers on a moving subway railcar will see an apparent motion picture effect. In an exemplary embodiment of the system, strobe lights coupled to the subway railcar or within the tunnel itself are flashed as a function of the speed of the railcar to sequentially illuminate the fixed pieces of artwork. In one embodiment, a rotatable scroll containing portions of plurality of separate artwork sequences enables remote selected of the artwork pieces. In another embodiment, the frames of artwork are displayed through a slide projection (129) system or a flat screen LED monitor linked to a remote control terminal for changing the displays. In an alternate embodiment, a soundtrack coordinated with the artwork plays along as the railcar passes by. In still another embodiment, successive rows of LED lights are mounted on the wall's surface facing the railcar, each light coupled to a control system for flashing the light for a prescribed period.

15 Claims, 22 Drawing Sheets

STROBE LIGHT, ARTWORK GEOMETRY DETAIL

BLOCK DIAGRAM OF STROBE LIGHT CONTROL SYSTEM

BLOCK DIAGRAM OF FLASH RATE CONTROL SCHEME

WINDOW MOUNTING

WINDOW / FRONT VIEW

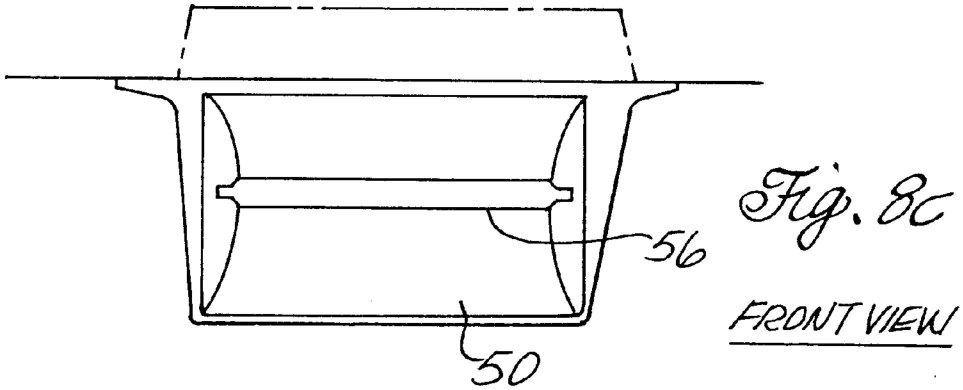
Fig. 8c
FRONT VIEW
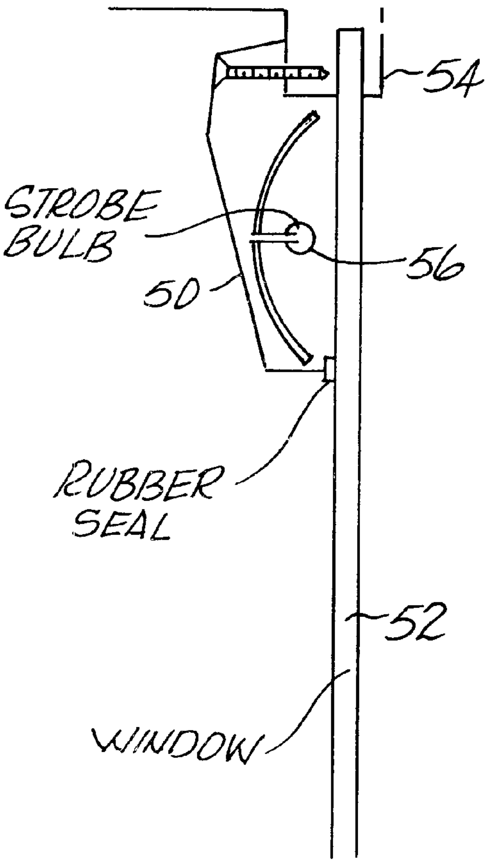
Fig. 8d
SIDE VIEW
Fig. 8e
TOP VIEW
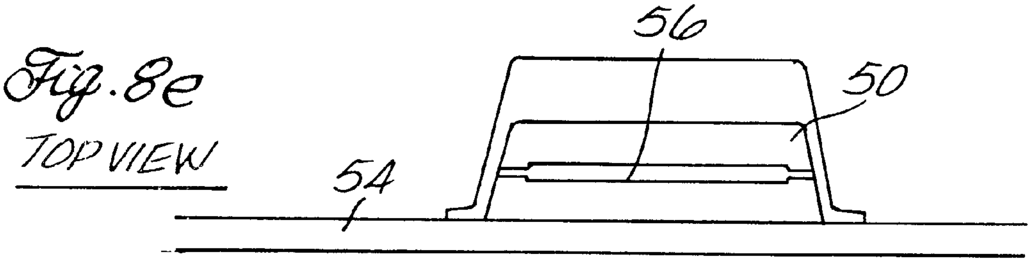

REAR VIEW

Fig. 9c
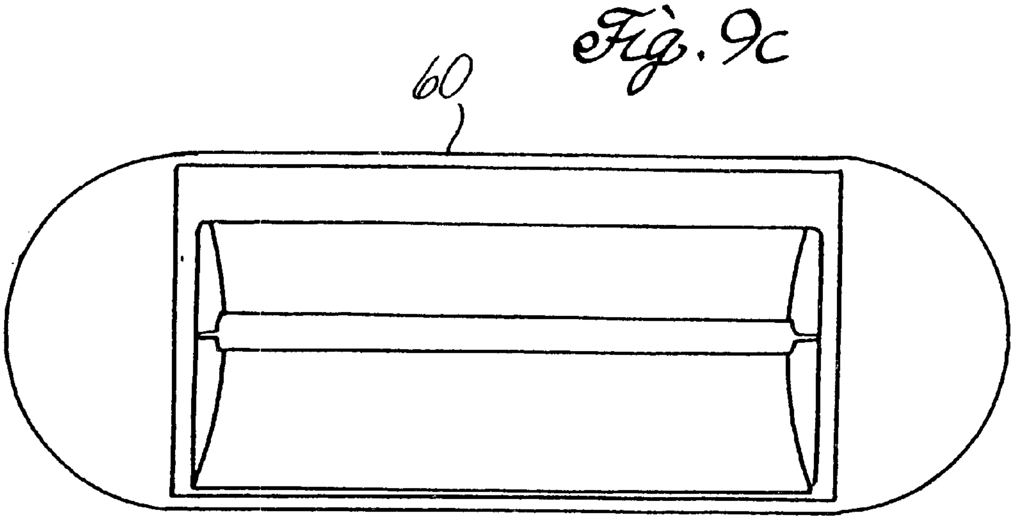
TOP VIEW
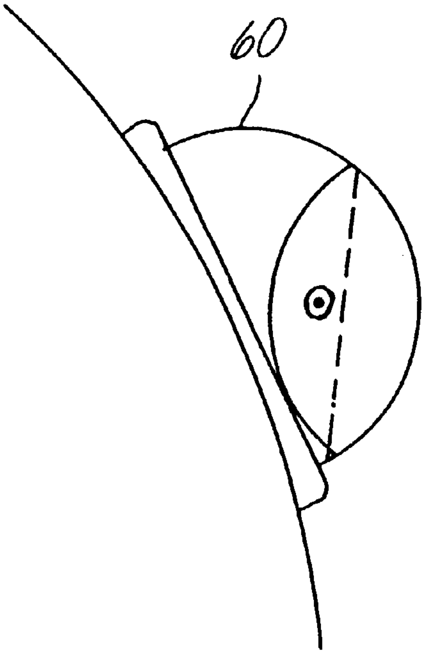
Fig. 9d
SIDE VIEW

FRONT VIEW

APPARATUS AND METHOD FOR PRESENTING APPARENT MOTION VISUAL DISPLAYS

This application claims benefits to U.S. Provisional No. 60/022,315 filed Jul. 23, 1996.

FIELD OF INVENTION

The present invention relates generally to visual displays, and more particularly, to an apparatus and method for illuminating individual pieces of fixed artwork such that an observer on a moving object sees a visual display in which the artwork has an apparent motion picture effect.

BACKGROUND OF THE INVENTION

Millions of commuters throughout the world travel on trains, subways and elevators to get from one place to another each day. During these commutes, the commuter is temporarily held captive and must somehow pass time until reaching the desired destination. Until now, nobody has been able to deliver a system that meets the needs of public art and entertainment for commuters while proving financially beneficial for public transportation systems.

Artists, advertisers and others in the media constantly strive to present artwork and messages in ways that grasp and hold the attention of the viewer. One way this has been achieved is through the use of motion pictures. Throughout the modern era, viewers have been fascinated by motion pictures as a vehicle for receiving information. The captivating quality of a motion picture derives in part from its realism and ability to convey action in a way that fixed artwork cannot.

In an increasingly fragmented media marketplace, those skilled in the art of developing new applications would prefer a novel and versatile form of media that captures the attention of the commuter, presents information in a captivating way and makes public transportation more desirable.

The theory of kinetoscopes and their application to moving vehicles is known in the art, but each system presented suffers from drawbacks that make them impractical. U.S. Pat. No. 5,108,171, for example, uses an unnecessarily complex system of coded light signals to trigger the light source to illuminate the artwork. U.S. Pat. No. 4,383,742 uses an illumination system which is impractical because it requires more space than is typically available in many subway tunnels. Both systems may suffer from blurred images because there is no assurance that when one piece of artwork is illuminated, it will not also illuminate a portion of the adjacent artwork, thus creating a distorted frame.

Furthermore, there is no way in existing systems to rapidly change the pieces of artwork presented to the commuter. Advertisers and others would desire a system in which their displays could be varied. In existing systems, the artwork is mounted to a platform or affixed to the tunnel wall. To change the pieces of artwork, one would have to physically enter the tunnel, remove the artwork pieces and replace them with the new ones, which is difficult, time consuming and poses safety concerns.

SUMMARY OF THE INVENTION

There is therefore provided according to the present invention a new and innovative apparatus and method for providing visual art, entertainment and advertising by illuminating or otherwise bringing into view single successive pieces or "frames" of artwork so that passengers will see the individual artwork pieces in the same relative location and in a rapid enough time sequence that an apparent motion picture effect is seen in the art.

In a presently preferred embodiment, the pieces of artwork are affixed to walls of a dark or dimly lit subway tunnel. Strobe lights coupled to the subway railcar or within the tunnel itself are flashed as a function of the speed of the railcar to sequentially illuminate the fixed pieces of artwork. The effect of this sequential illumination is that passengers on the railcar see a visual display in which the artwork has apparent motion. To avoid image distortion, two separate control circuits are used to trigger the strobes for adjacent pieces of artwork. The system also allows the artwork to be remotely changed. In one embodiment, a scrolled artwork system containing portions of a plurality of separate artwork sequences enables selection of the artwork pieces. In another embodiment, the frames of artwork are displayed electronically through a slide projection system or a flat screen LED monitor linked by a cable or satellite to a remote control terminal for changing the displays.

In an alternate embodiment of the present invention, a soundtrack coordinated with the artwork plays along as the railcar passes by. When viewers pass a certain section of artwork they will hear the soundtrack associated with that section. In still another embodiment, successive rows of LED lights are mounted on the wall's surface facing the railcar, each light coupled to a control system for flashing the light for a prescribed period. The combination of the flashing lights and the moving railcar is used to present messages or images to the viewers in transit.

By animating tunnel walls with apparent motion visual displays that can be changed, a benefit of the present invention is its ability to make public transportation on trains and subways more appealing for commuters.

DESCRIPTION OF THE DRAWINGS

These and other advantages of the present invention will be readily understood and appreciated upon consideration of the following detailed description taken in conjunction with the accompanying drawings in which:

FIGS. 8*a*–8*f* are various views of an embodiment of the present invention in which strobe lights are window mounted to the interior of the railcar;

FIGS. 9*a*–9*e* are various views of an embodiment of the present invention in which the strobe lights are mounted to the exterior of the railcar;

DETAILED DESCRIPTION

Figure 1:
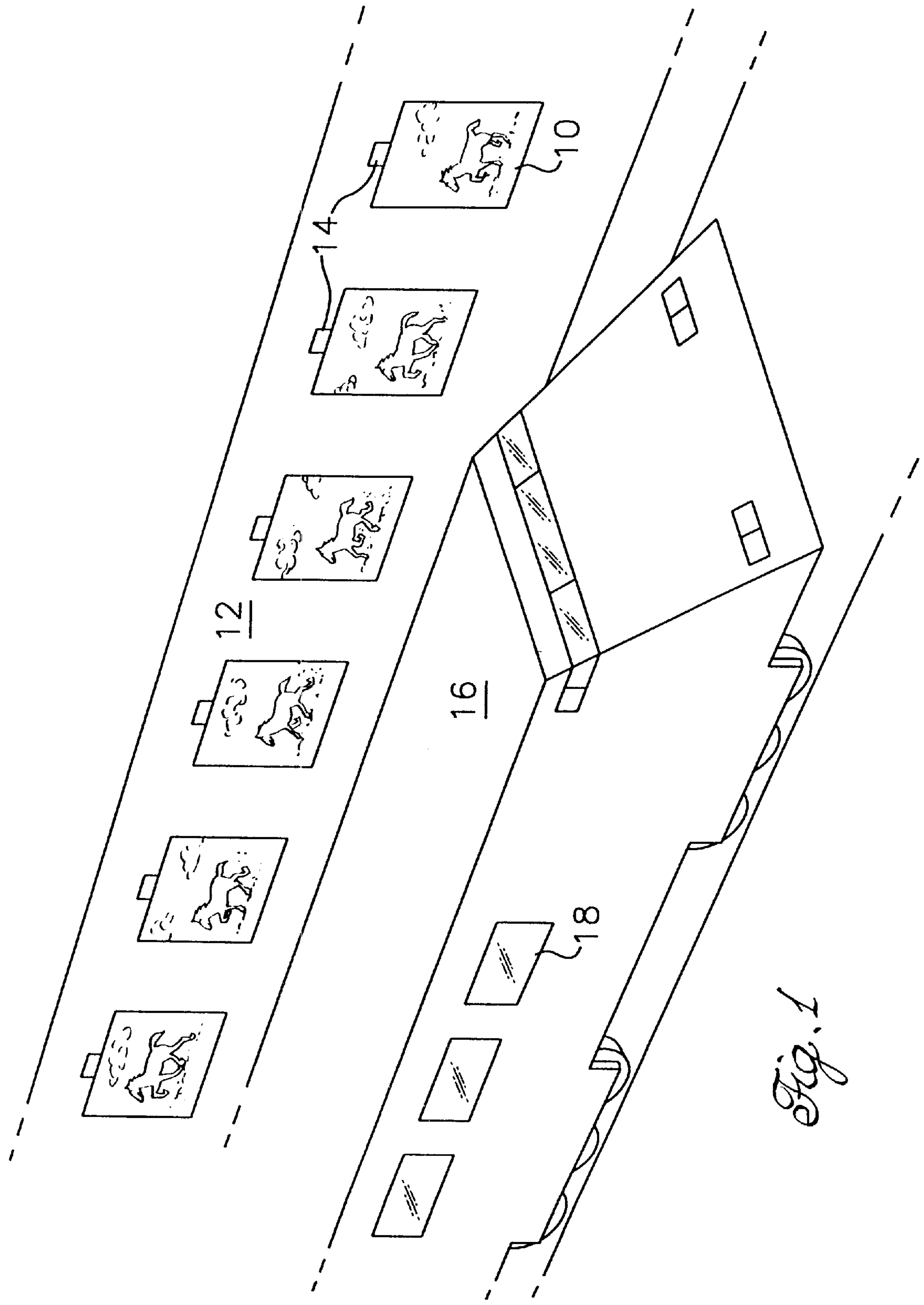
FIG. 1 is a perspective view of a subway railcar and artwork affixed to walls of a subway tunnel.

Referring to FIG. 1, in an exemplary embodiment, pieces of artwork 10 are affixed to a surface 12. This surface may be the wall of a subway tunnel, a canvas, poster board, or any other platform or substrate on which artwork can be displayed, drawn or presented. Each piece of artwork is analogous to a single frame of a motion picture. The artwork may encompass a wide variety of forms including, for example, posters, paintings, pictures or even "invisible" ink drawings that become illuminated by infrared or other special types of light. Other artwork displays, described in more detail below, include artwork scrolls, slide projected images and images on monitors. Any type of artwork or drawing is suitable so long as its visibility can be controlled by some means.

In an exemplary embodiment, stroboscopic lights 14 are focused on the pieces of artwork. As the railcar 16 moves through the tunnel, the strobe light facing the corresponding piece of artwork flashes, thereby illuminating successive "frames" of artwork for the equivalent of one frame. Through the sequential illumination of frames, the moving passenger observes through railcar windows 18 an apparent motion picture show on the surface.

Figure 2:
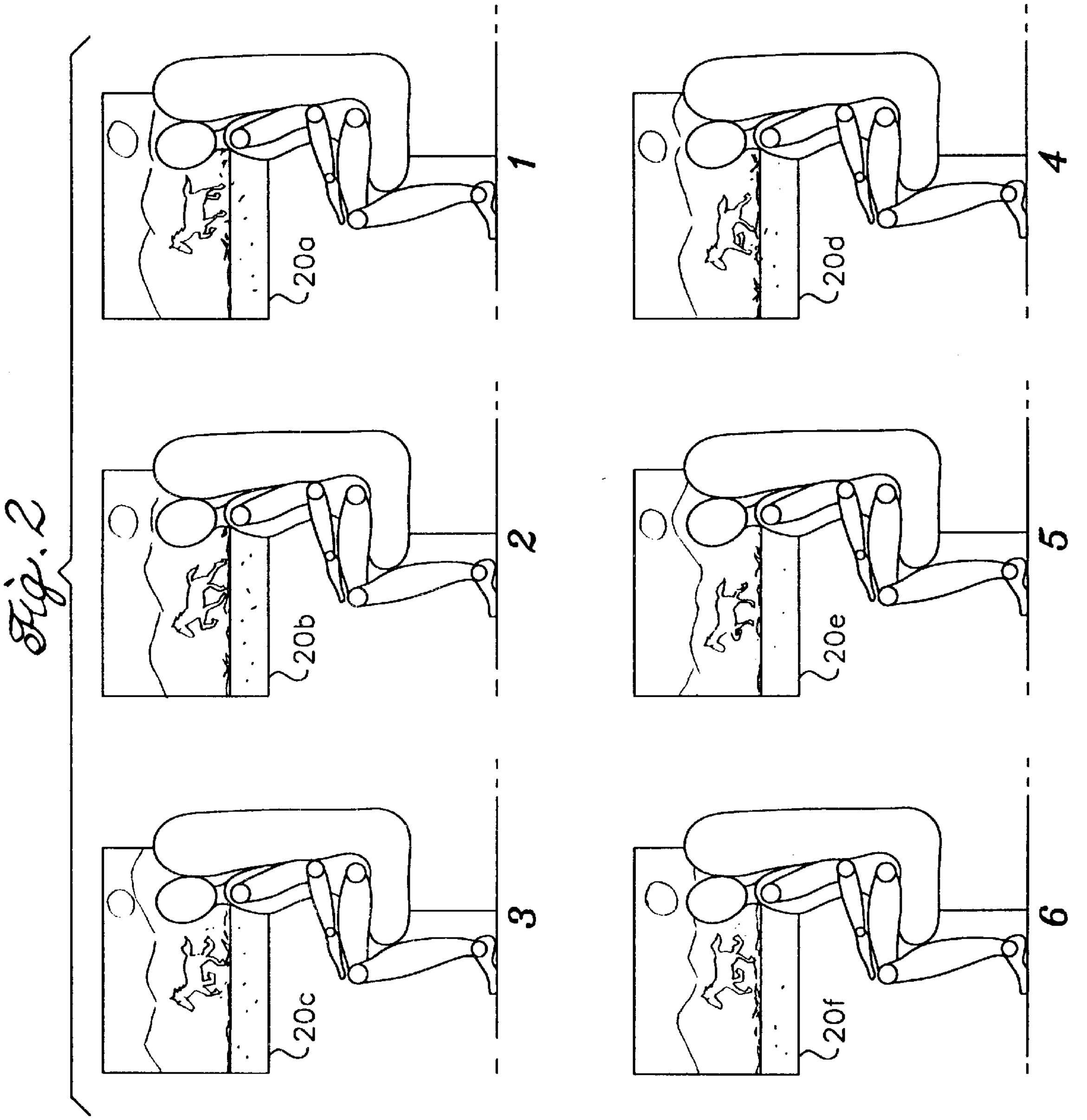
FIG. 2 is a view of exemplary frames of artwork as would be seen through a subway rail car window.

Referring to FIG. 2, six pieces 20*a–f* of a sample motion picture sequence are shown, in which each piece of artwork is like a frame depicting a fraction of a movement. The developer of the artwork has great discretion in developing an apparent motion visual display according to the present invention. For example, the frames may tell a story or involve particular themes between stations. The sequence may involve animation, or may be used to flash messages, art or advertisements to viewers. In any given sequence, there may be hundreds or thousands of posters of artwork, depending on the length of the tunnel between adjacent stations.

Figure 3:
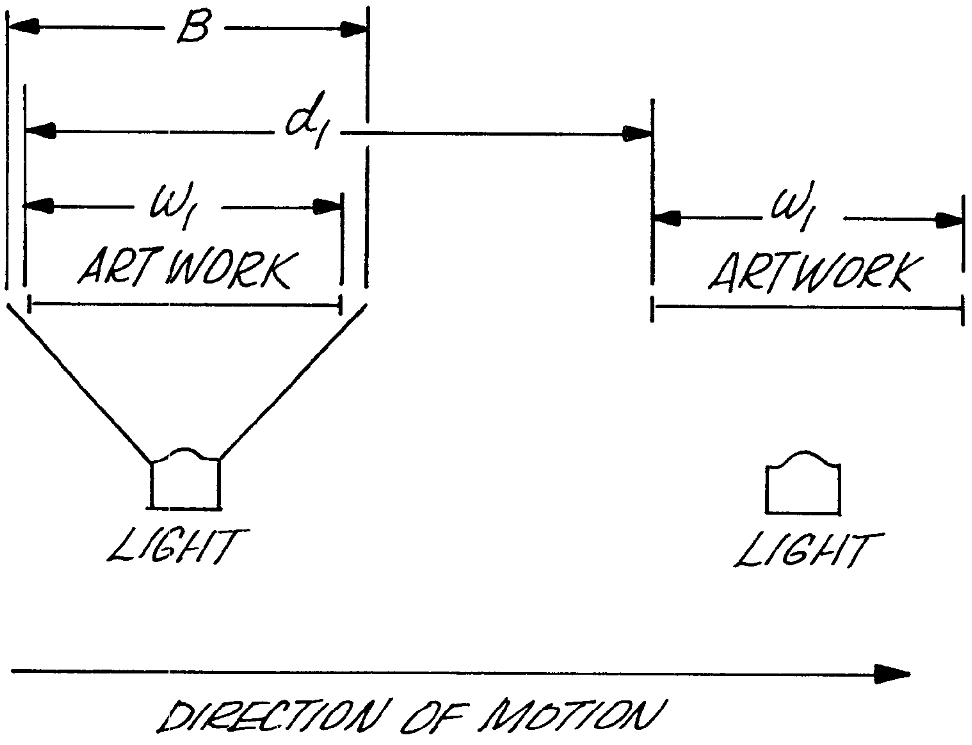
FIG. 3 is a diagram illustrating the geometric relationship between the strobe lights and artwork.

Referring to FIG. 3, a schematic diagram of the geometric relation of the strobe light to the artwork is shown according to an exemplary embodiment of the present invention.

Relevant parameters are set forth in Table 1 as follows:

TABLE 1

| Parameters | |
|---|---|
| N | number of frames per second desired |
| T | period of flash cycle = 1/N |
| $d_1$ | distance between artwork |
| $w_1$ | width of artwork |
| B | width of strobe light beam at artwork |
| v | velocity of train |
| $t_i$ | time period during which strobe light is on |
| $t_r$ | time period during which strobe light is off |

Relevant relationships between certain parameters include:

Relationships $$t_i + t_r = 1/N$$

$$T = d_1/v$$

$$d_1 = Tv$$

In order for the passenger to view the artwork in the same relative position (consistent field of view), the flash rate, N, should preferably vary as a function of the train speed. If the flash rate and speed are not synchronized, the artwork will tend to move past the viewer's field of vision, or drift, in one direction or the other.

$$N = v/d_1$$

Assuming there is a range of flashes per second at which the motion picture effect will work, the above formula defines a range of speeds depending on the size of the artwork.

If the duration of time the light is on is a significant fraction of the period, T, the duration of the flash may become another important consideration for a number of issues. Since strobe lights tend to have a very short duration, on the order of a microsecond, many concerns regarding flash duration can usually be ignored.

Issues Dependent on Flash Duration

Following are general considerations, some or all of which should be taken into account in designing an apparent motion visual display according to the present invention. The following general issues need not be taken into account, for example, if the flash duration is shorter than about 10 milliseconds, the distance between artwork is less than about 10 feet and the size of the artwork is under about six feet:

The artwork size will also be a function of the difference between the amount of time the light is on and off and train speed. Assume that the ratio of $t_i/t_r=1$(light is on as long as it is off), then $t_i=T/2=t_r$.

The light beam size (angle) will be a function of the amount of time the light is on and off and also the train speed.

In order for the artwork to be fully illuminated for the full time that the light is on, the width of the light beam at the artwork, B, must be wider than the artwork by a distance equal to or more than $vt_i$. Thus, if when the light comes on, the leading edge of the beam is at the right hand edge of the picture (when the motion is from left to right), then when the light goes off, the trailing edge of the of the beam will not have reached the left hand edge of the picture.

During the rest period, when the light is off, the beam leading edge must move to the right hand edge of the next frame, a distance equal to $vt_r$.

The distance between the artwork must be greater than $vt_i$.

As the train speeds up, the rate of flashes will increase. If the ratio of $t_i$ to $t_r$ stays the same, the geometries should be the same for any speed.

The following spreadsheet shown in Table 2 calculates the distance the beam moves and a recommended beam width for a variety of train speeds with a flash duration of 10 milliseconds and at the fastest train speed with a flash duration of 1 microsecond. In this example, the flash is assumed to be sufficiently fast so that the issues dependent on flash duration need not be taken into account. With the proper choice of beam width, only the flash rate has to vary with train speed.

TABLE 2

Strobe Light Beam Width Correlation

| Parameter | | | ti = .01 se | | | .000001 s |
|---|---|---|---|---|---|---|
| v, mph | 20 | 25 | 30 | 35 | 40 | 40 |
| d1, ft | 6 | 6 | 6 | 6 | 6 | 6 |
| w1, ft | 3 | 3 | 3 | 3 | 3 | 3 |
| T = d1/v, sec | 0.204545 | 0.163636 | 0.136364 | 0.116883 | 0.102273 | 0.102273 |
| ti, sec | 0.01 | 0.01 | 0.01 | 0.01 | 0.01 | 1E-06 |
| tr = T − ti, sec | 0.194545 | 0.153636 | 0.126364 | 0.106883 | 0.092273 | 0.102272 |
| B, ft | 4 | 4 | 4 | 4 | 4 | 4 |
| dm, ft | 0.2 | 0.25 | 0.3 | 0.35 | 0.4 | 4E-05 |
| dr, ft | 3.2 | 3.25 | 3.3 | 3.35 | 3.4 | 3.00004 |

where:
v = velocity of train;
d1 = distance between artwork;
w1 = width of artwork;
T = Period, the time between flashes, i.e., the time between when the light comes on until it comes on again;
ti = time light is on
tr = time light is off. T = ti + tr
B = width of the light beam at the artwork
dm = distance beam moves when light is on
dr = required beam width = dm + w1 (must be < d1).

A fixed beam width can be picked that will cover the range of train speeds and light timing. If the flash duration is on the order of 1 microsecond, there should be no problem with the variability of the required beam width for varying train speeds. A conservatively wide beam can be chosen to ensure that the artwork is fully illuminated for the duration of the flash. The same is true if the flash duration is as long as 10 msec. The beam will only move 0.4 feet in 0.01 sec at 40 mph.

The length of the sequence of artwork is a consideration in the control of the strobe light. If the sequence is long, the probability of train speed varying during the time the train is passing the artwork will be relatively high and the timing of the flashes may have to be carefully controlled to make sure that the illumination does not drift off the artwork. If the sequence is short, it is less likely that train speed will change and it will be easier to ensure that the illumination is always aligned with the artwork.

Figure 4:
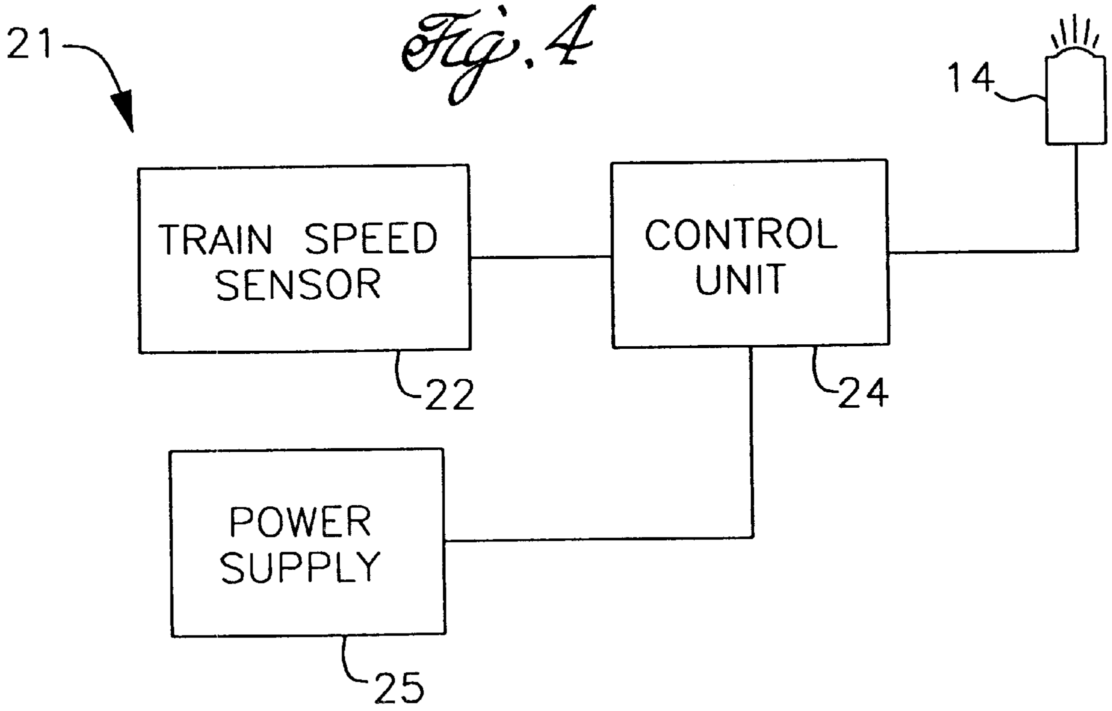
FIG. 4 is a block diagram of an exemplary strobe light control system.

There are at least three exemplary strobe light control techniques to vary the strobe light flash rate, N, to illuminate the frames of artwork. Referring to FIG. 4, the first system 21 detects train speed through a suitable sensor 22 and enters the speed as a variable to the strobe light control unit 24 so that the strobe light flash rate will vary as train speed. In this case, as the train approaches a sequence of artwork, the sensor triggers the strobe 14 to begin flashing at the proper position and the rate would vary with train speed, so that each piece of artwork is properly illuminated. The flash rate is a function of train speed and varies if the train speed varies. Flash rate is controlled by intermittently delivering power from the power supply 25 or by another suitable means. The advantage of this technique is that the flash rate is easily varied and the train speed is easily detected through a radar sensor, for example, housed within the tunnel or other means coupled to the train's speedometer.

Figure 5:
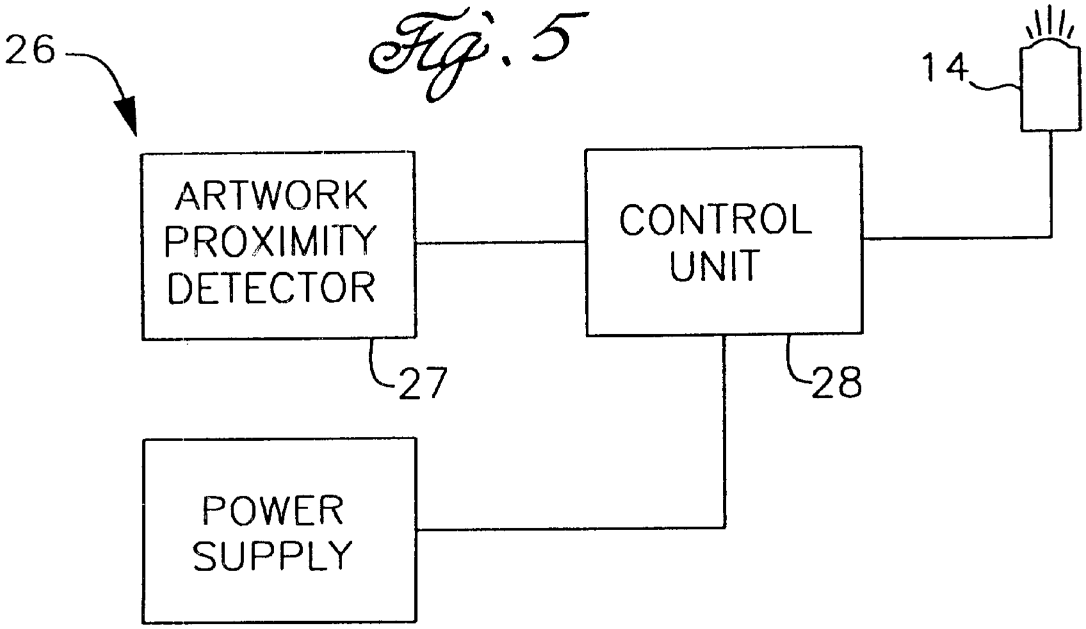
FIG. 5 is a block diagram of another exemplary strobe light control system.

Referring to FIG. 5, a second strobe light control system 26 triggers each strobe flash with input from an artwork proximity sensor 27 in which artwork position is sensed as the railcar approaches the artwork. In this system, the sensor notifies the control unit 28 when the light has reached each piece of artwork and the strobe light 14 is flashed at the appropriate time, for each piece of artwork. This can be accomplished, for example, through a beam/mirror arrangement for reflecting light on to the artwork, an infrared optical detector or other suitable means. The components of the sensors may be located on the train, tunnel, or on both the train and tunnel. An advantage of this system is that flash rate is directly coupled to the location of the artwork for proper synchronization.

Figure 6:
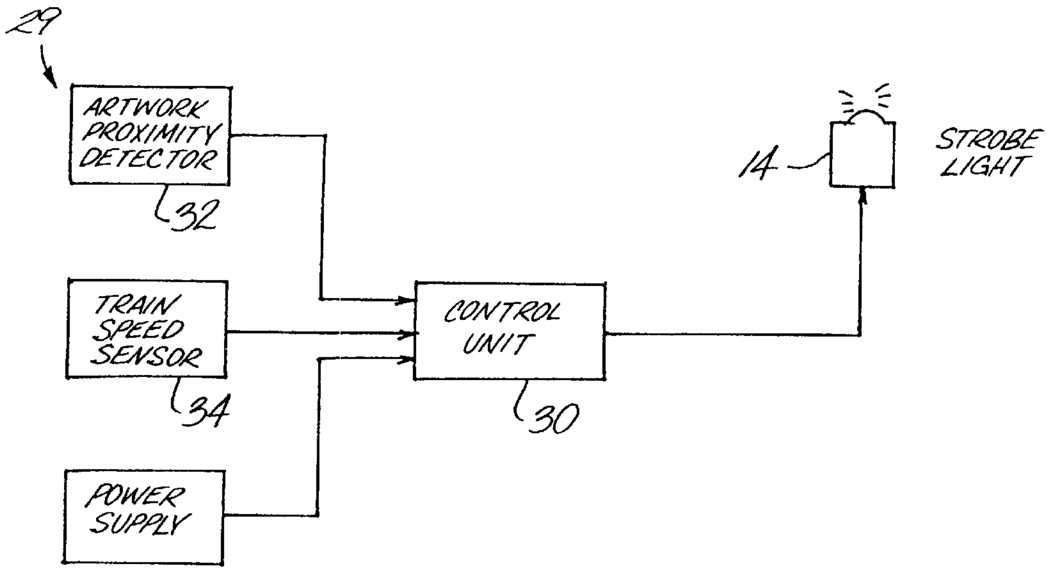
FIG. 6 is a block diagram of yet another exemplary strobe light control system.

Referring to FIG. 6, a third system 29 which combines the features of the systems of FIGS. 4 and 5, includes a control unit 30 which uses the artwork position and train speed to control illumination of the strobe light 14. As above, artwork position is input through an artwork proximity sensor 32, and train speed is input through a suitable sensor 34. An advantage of this system is that illumination of the artwork pieces is synchronized with separate parameters, thereby further ensuring proper illumination of the artwork as the train passes.

Figure 7:
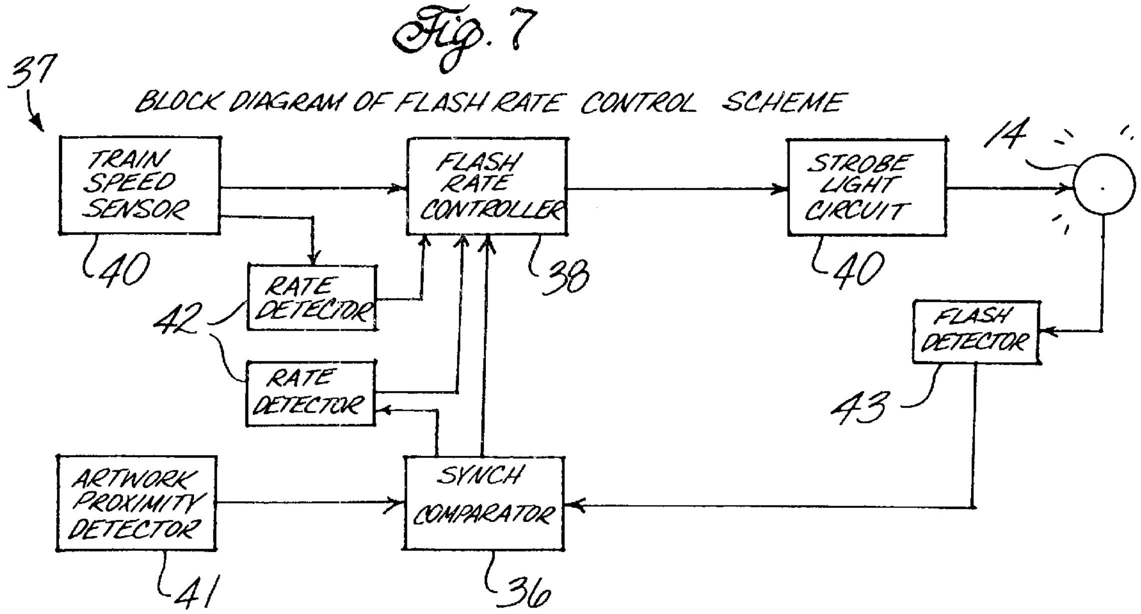
FIG. 7 is a block diagram of an exemplary control scheme for controlling the flash rate of individual strobe lights.
Figure 8A:
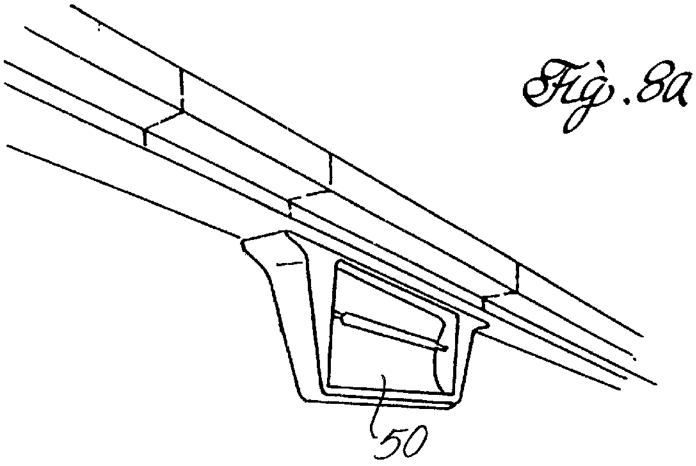
Figure 8B:
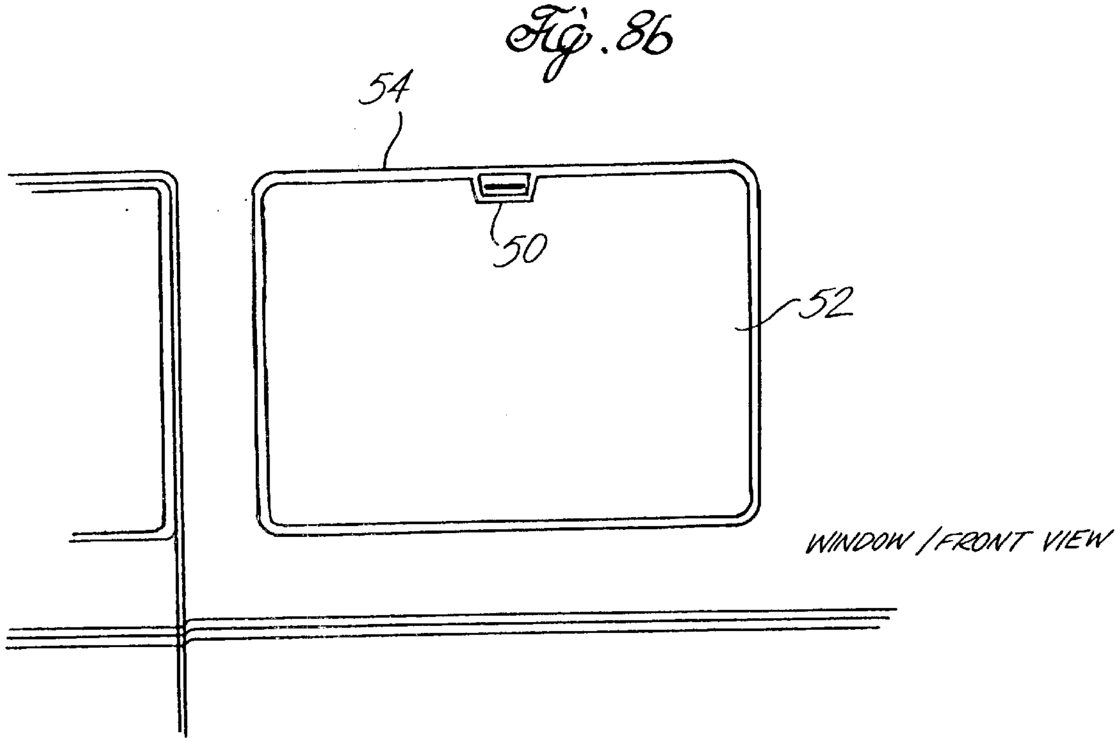
Figure 8F:
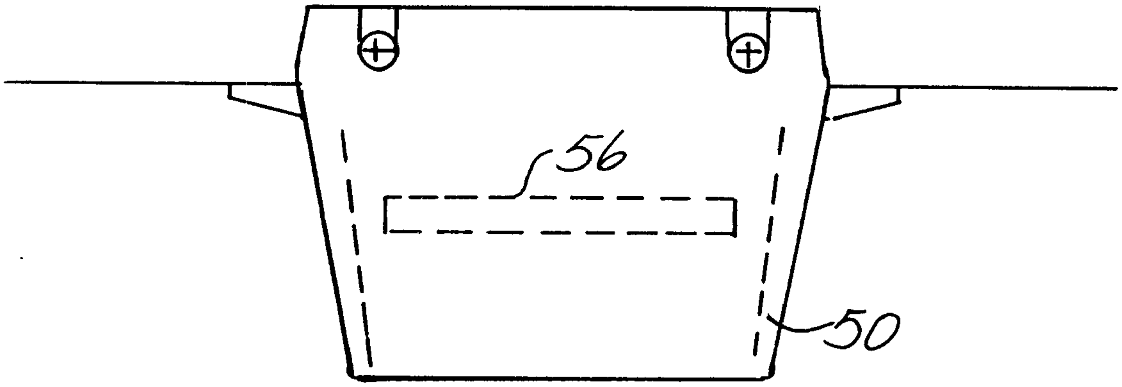
Figure 9A:
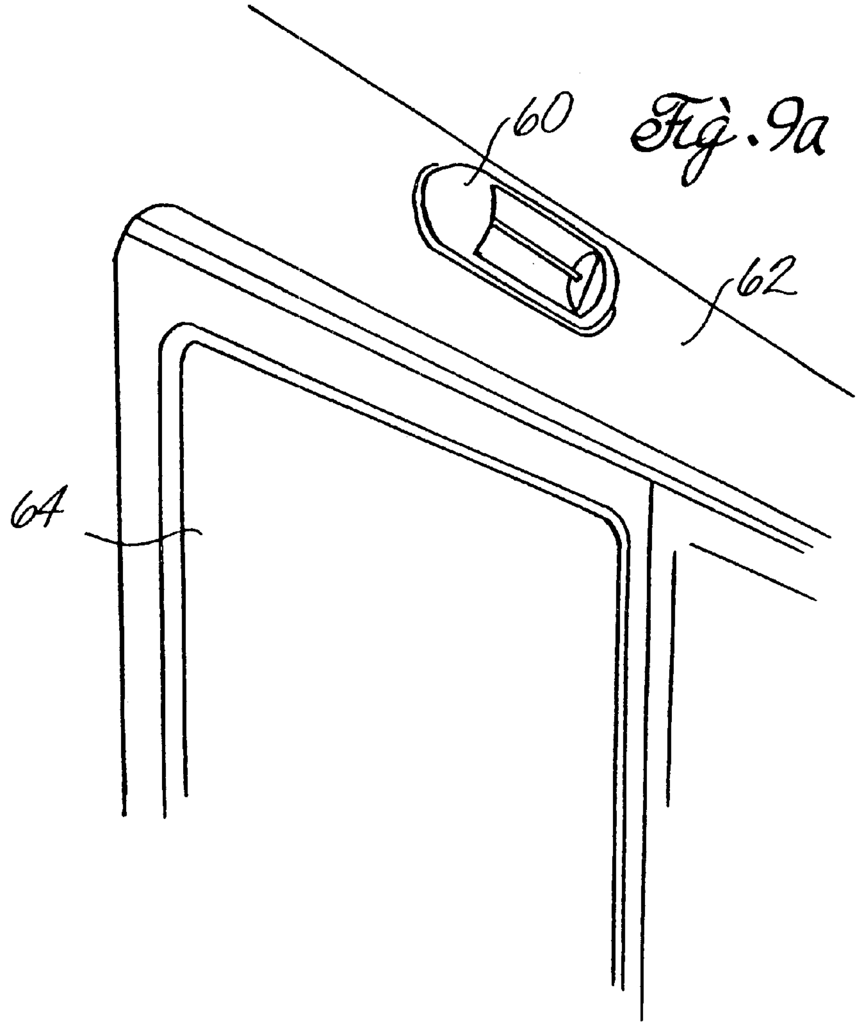
Figure 9B:
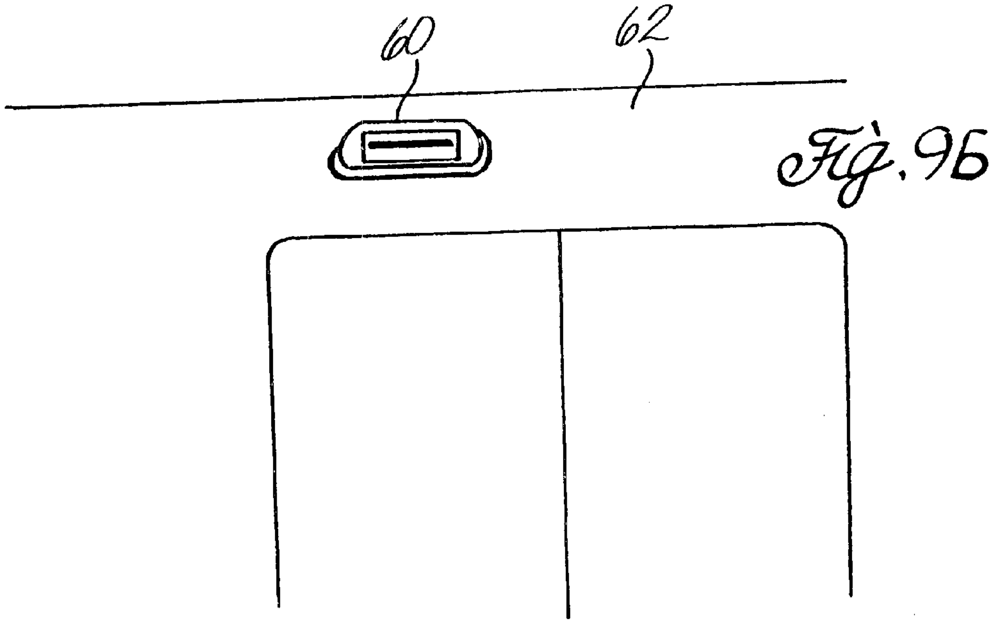
Figure 9E:
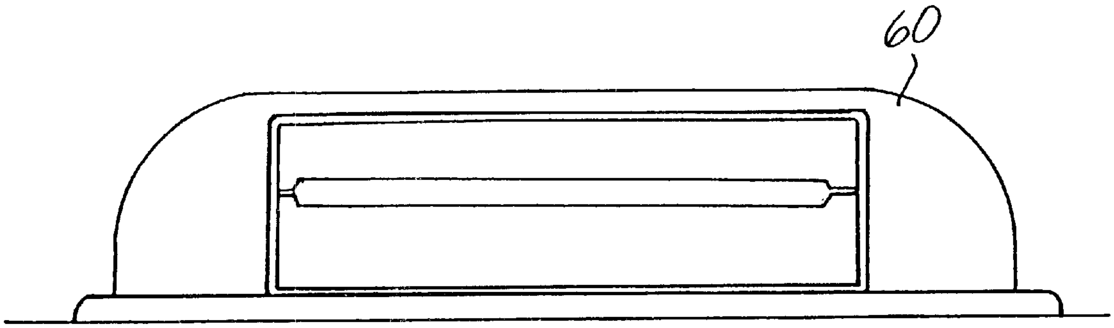

Referring to FIG. 7, another system 37 is shown in which the train speed sensor 40, proximity director 41, and rate signals from a rate detector 42 control the strobe light flash rate through controller 38 coupled to strobe light circuit 40. This unit uses feedback to compensate for "drift". In this system, the control unit senses the speed of the train, the proximity of the artwork to the train, and flashes of the strobe light. The control unit also calculates the differential (rate of change) of the train speed and distance between the train and the artwork. The controller 38 compares flash rate versus speed and flash rate versus proximity of artwork to determine whether the strobe light is properly focused and has the proper flash rate to illuminate the flames of artwork for the apparent motion visual effect. A synch comparator 36 actively synchronizes the strobe light to illuminate the frames of artwork using feedback from a flash detector 43. Accordingly, flash rate is controlled as a function of train speed moderated by the relative position of the light and the artwork at the time of flash. The rate detectors improve the tracking ability by using the rate of change of train speed and the rate of change of relative position of the light and artwork at the time of flash. Advantages of this system include improved tracking.

Due to the variation of trains, tunnels and public transportation systems, some degree of custom design may have to occur to optimize the invention for a particular location. For example, depending on where the invention is used, there may be different amounts of available wall space, different distance between the railcar and tunnel walls or different locations on the railcar or tunnel on which the strobe lights can be mounted. To address these potential differences, the strobe lights according to the present invention may be mounted in a variety of locations on the railcar or within the tunnel itself.

Referring to FIGS. 8*a* through 8*f*, the strobe lights 50 are shown mounted to a window on the railcar. The strobe light assembly is fastened to the window frame 54, and sealed to the window. The bulb 56 is focused out the window toward the artwork to be illuminated. Referring to FIGS. 9*a* through 9*e*, in an alternate embodiment, the strobe lights 60 are mounted to the exterior of the railcar 62 above the passenger windows 64.

Figure 10:
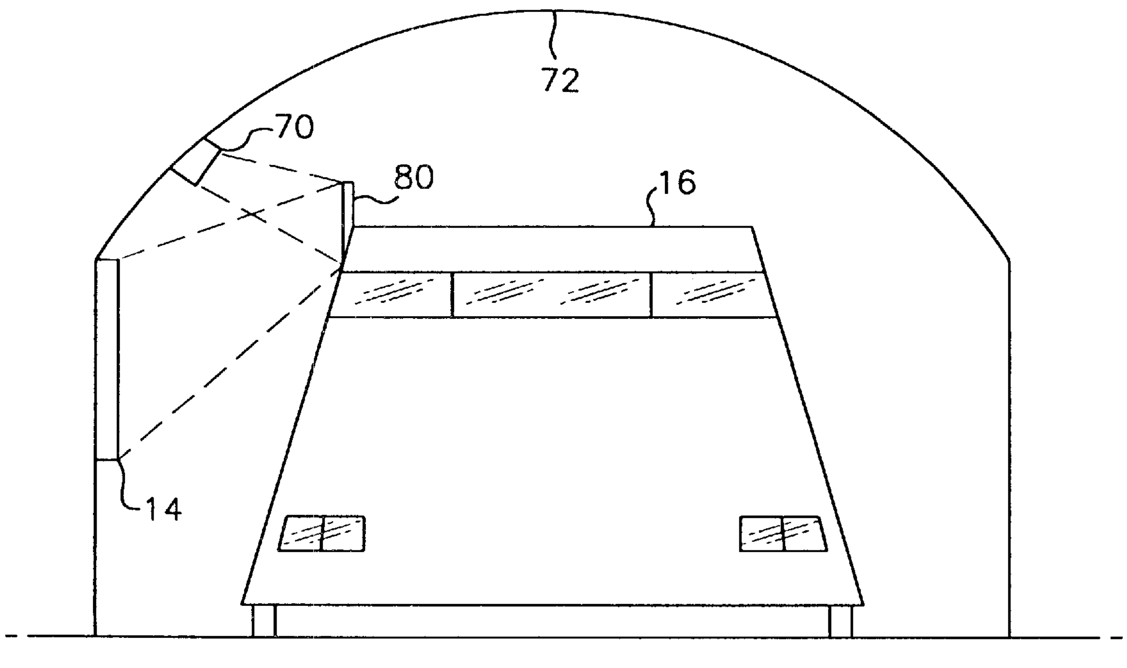
FIG. 10 is a diagram of an exemplary beam/mirror sensor system for illuminating the artwork.
Figure 11:
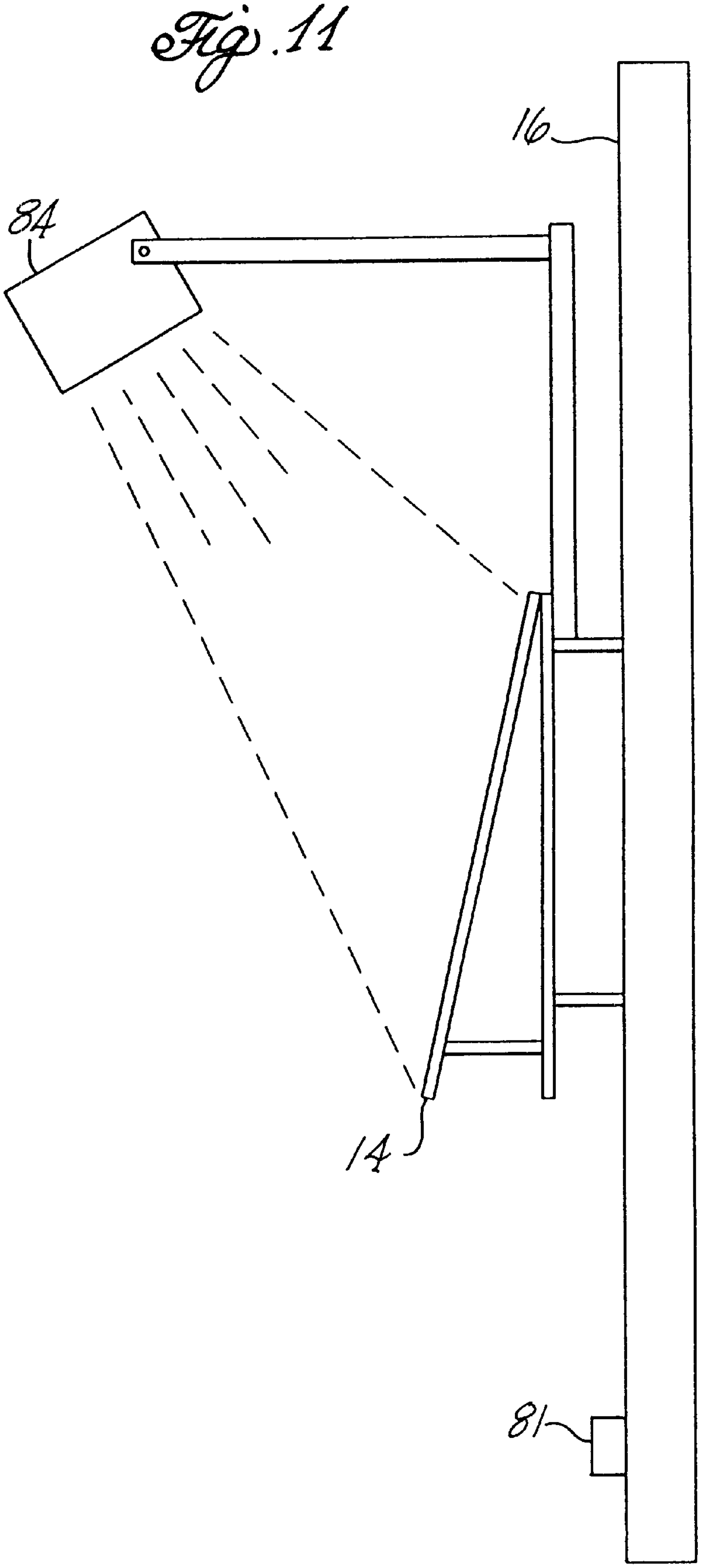
FIG. 11 is a view of an exemplary embodiment of the present invention in which the strobe light is mounted within the tunnel and focused on the artwork.

Referring to FIG. 10, in yet another embodiment, a beam of light from a light source 70 within the tunnel 72 is focused on a mirror 80 on top of the railcar 16. The mirror is positioned to intercept the light beam and reflect it back toward the pieces of artwork 14. In this embodiment, the light source does not have to be a strobe light. A focused spot light that is constantly on while the train is the tunnel could produce the desired effect. Referring to FIG. 11, where it is not feasible to place the strobe lights directly on the railcar, the lights 84 may be placed within the tunnel 16 itself adjacent the artwork 14. As the train passes by, an infrared sensor 81 triggers the tunnel mounted strobe lights to illuminate the artwork.

Figure 12:
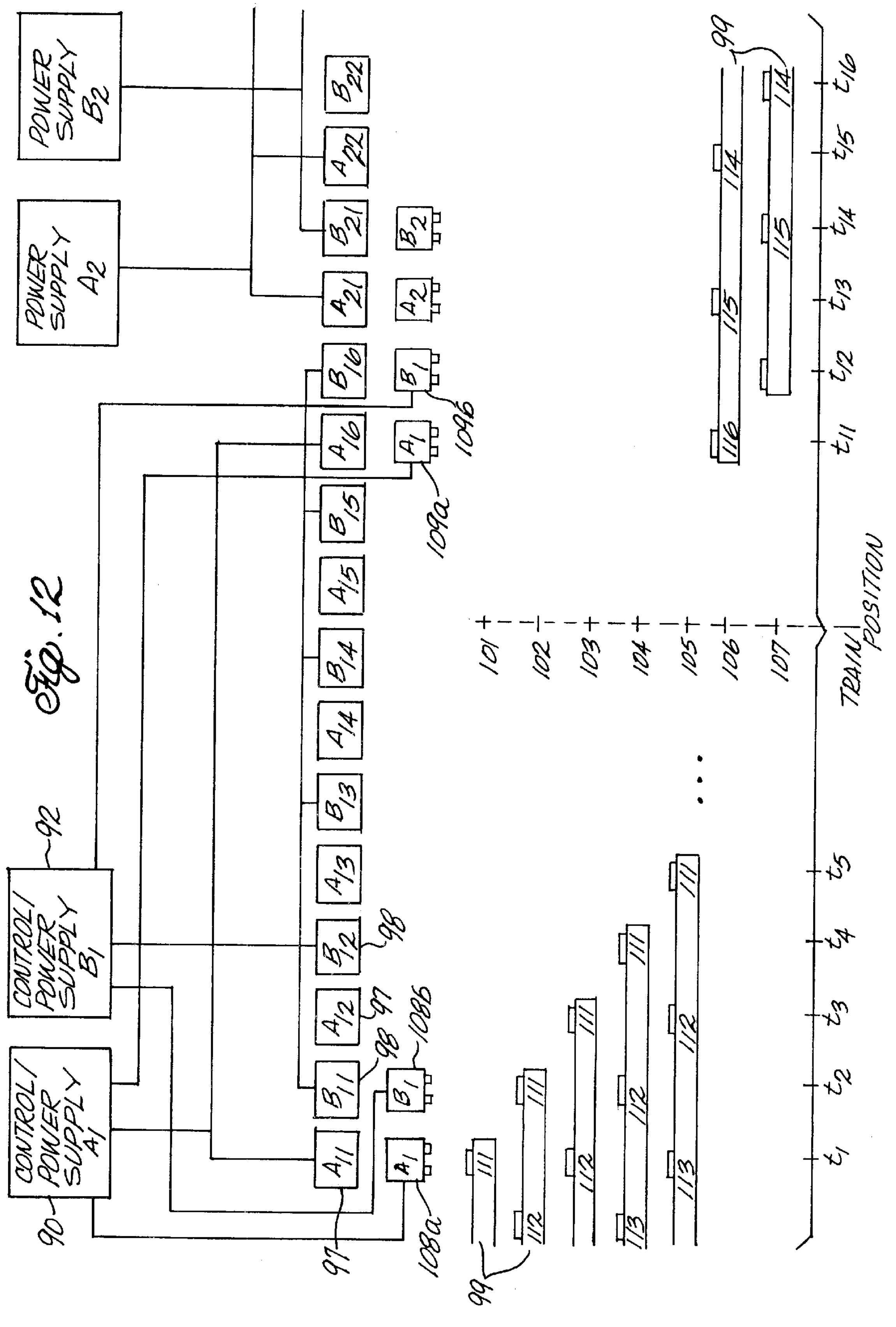
FIG. 12 is a diagram of an alternate embodiment in which only alternating frames of artwork are illuminated to promote image clarity.

For optimal apparent motion, the control system preferably ensures that viewers only see the piece of artwork they are supposed to see for the proper amount of time. If the image is illuminated for too long, or if a viewer sees a portion of an adjacent frame, image clarity may be affected. Referring to FIG. 12, an alternate embodiment of a control system is shown to help eliminate this effect. This embodiment involves coupling adjacent frames to different power supplies that are alternately activated so that adjacent frames are not illuminated at the same time. By only flashing every other frame each flash period, the passenger sees the frame directly opposite his or her window and does not see any residual flash from an adjacent frame that may tend to degrade image clarity. In the diagram, the squares 97 (individually labeled $A_{xy}$) and the squares 98 (individually labeled $B_{xy}$) represent the artwork and associated lamps coupled to the corresponding control circuit/power supplies $A_1$ (90) and $B_1$ (92), respectively. The long horizontal rectangles 99 represent the train or railcar having viewing positions 111–116 at successive train positions 101–107 (corresponding to times t) where the flashes will be triggered. The viewing positions may correspond to a particular railcar or group of windows through which one or more passengers observes the apparent motion visual display. The squares 108*a*, 108*b*, 109*a*, 109*b* represent optical detectors coupled to the power supplies that sense the viewing position by detecting a reflected light beam from a mirror mounted below the viewing position. In this example, the spacing between the viewing positions is twice the frame spacing.

In operation, at time $t_1$ (corresponding to position 101), the sensor 108*a* senses that the initial viewing position 111 on the railcar is opposite the first artwork frame $A_{11}$. The sensor will then trigger the $A_1$ power supply 90 corresponding to the $A_1$ strobes to flash, illuminating the six pieces of artwork labeled $A_{11}$, through $A_{16}$.

At time $t_2$ (corresponding to position 102), the sensor 108*b* senses that the initial viewing position 111 is opposite the second artwork frame $B_{11}$. The sensor will then trigger the $B_1$ power supply 92 corresponding to the $B_1$ strobes to flash, illuminating the six pieces of artwork labeled $B_{11}$ through $B_{16}$.

At time $t_3$ (corresponding to position 103), the initial viewing position 111 advances to the third artwork frame $A_{12}$ and the second viewing position 112 reaches the first artwork frame $A_{11}$. The sensor 108*a*, upon sensing the second viewing position, causes the $A_1$ strobes to flash, again illuminating the six pieces of artwork labeled $A_{11}$ through $A_{16}$.

At time $t_4$ (corresponding to position 104), the initial viewing position 111 advances to the fourth artwork frame $B_{12}$ and the second viewing position 112 reaches the second artwork frame $A_{11}$. The sensor 108*b*, upon sensing the second viewing position, causes the $B_1$ strobes to flash, again illuminating the six pieces of artwork labeled $B_{11}$ through $B_{16}$. The sequence of alternately flashing the $A_1$ and $B_1$ strobes continues until the end of the railcar comes to the end of the artwork and lights controlled by the control circuits and power supplies corresponding to $A_1$ and $B_1$.

At time $t_{11}$ (corresponding to position 106), the final (sixth) viewing position 116 of the railcar is opposite sensor 109*a* corresponding to the A1 strobes. Upon sensing the final viewing position, the sensor causes the $A_1$ strobes to flash, again illuminating the six pieces of artwork labeled $A_{11}$, through $A_{16}$. After this position, the $A_1$ strobes do not flash again until another car passes.

Finally, at time $t_{12}$ (corresponding to position 107), the final (sixth) viewing position 116 is opposite sensor 109*a* corresponding to the A1 strobes. Upon sensing the final viewing position, the sensor causes the $B_1$ strobes to flash, again illuminating the six pieces of artwork labeled $B_{11}$ through $B_{16}$. After this position, the $B_1$ strobes do not flash again until another car passes.

Figure 13A:
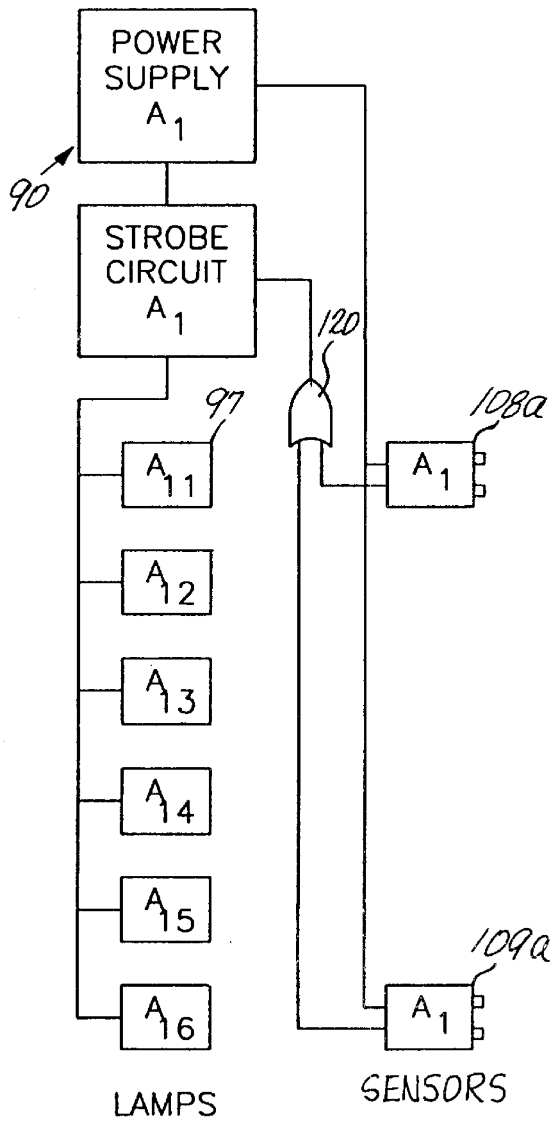
FIGS. 13*a* and 13*b* are block diagrams showing the control mechanism for the alternate embodiment of FIG. 12.
Figure 13B:
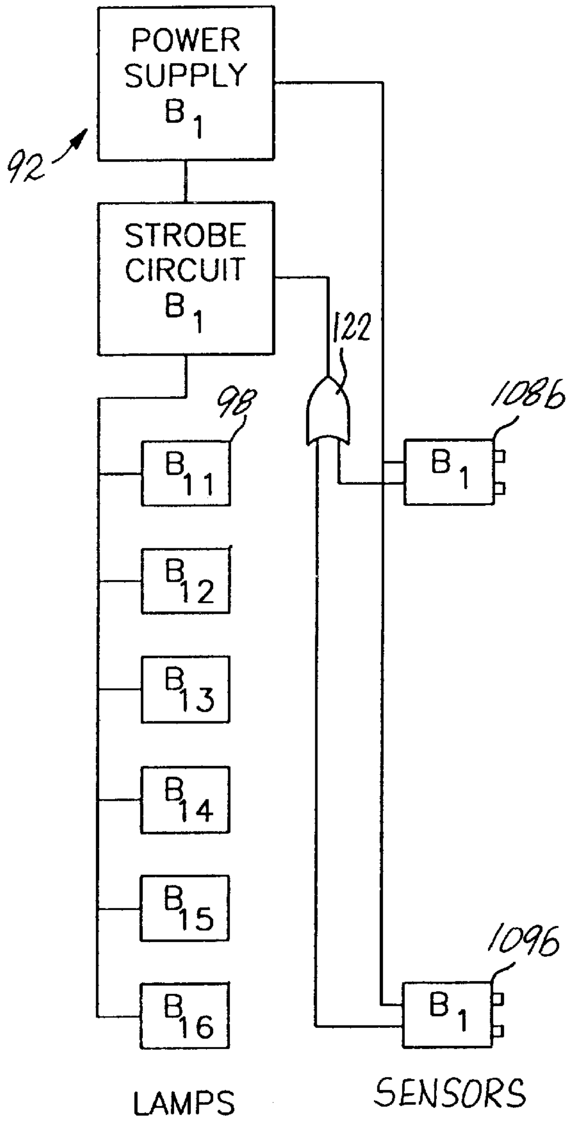

Those skilled in the art will appreciate that the system exemplified by FIG. 12 can be implemented for any number of different railcar lengths and viewing positions. In the system of FIG. 12, when the initial viewing position 111 is opposite the artwork frame $A_{16}$ and the sensor 109*a*, the final viewing position 116 is opposite frame $A_{11}$ and sensor 109*b*. Similarly, when the initial viewing position 111 is opposite the next artwork frame $B_{16}$ and the sensor 109*b*, the final viewing position 116 is opposite frame $B_{11}$ and sensor 108*b*. In both cases, two separate signals are sent to the corresponding control circuit/power supplies. To eliminate the possibility of inadvertent double flash, FIG. 13*a* illustrates the use of an OR logic element 120 having inputs coupled to the sensors 108*a* and 109*a* and an output coupled to the control circuit/power supply for the $A_1$ strobes 97. Similarly, FIG. 13*b* illustrates the use of OR logic element 122 having inputs coupled to the sensors 108*b* and 109*b* and an output coupled to the control circuit/power supply for the $B_1$ strobes 98. The OR circuit assures that only one signal will be sent to the control circuit regardless of whether one or both of the sensors are activated.

A variety of other enhancements can also be made. For example, if necessary, a filament or tint may be applied to the windows to prevent or reduce any residual reflection of light which may or may not occur from the strobes into the train. Additional visual effects can also be provided by offsetting red and blue shades in the artwork and illuminating it in such a way that a three dimensional effect is obtained.

Figure 14A:
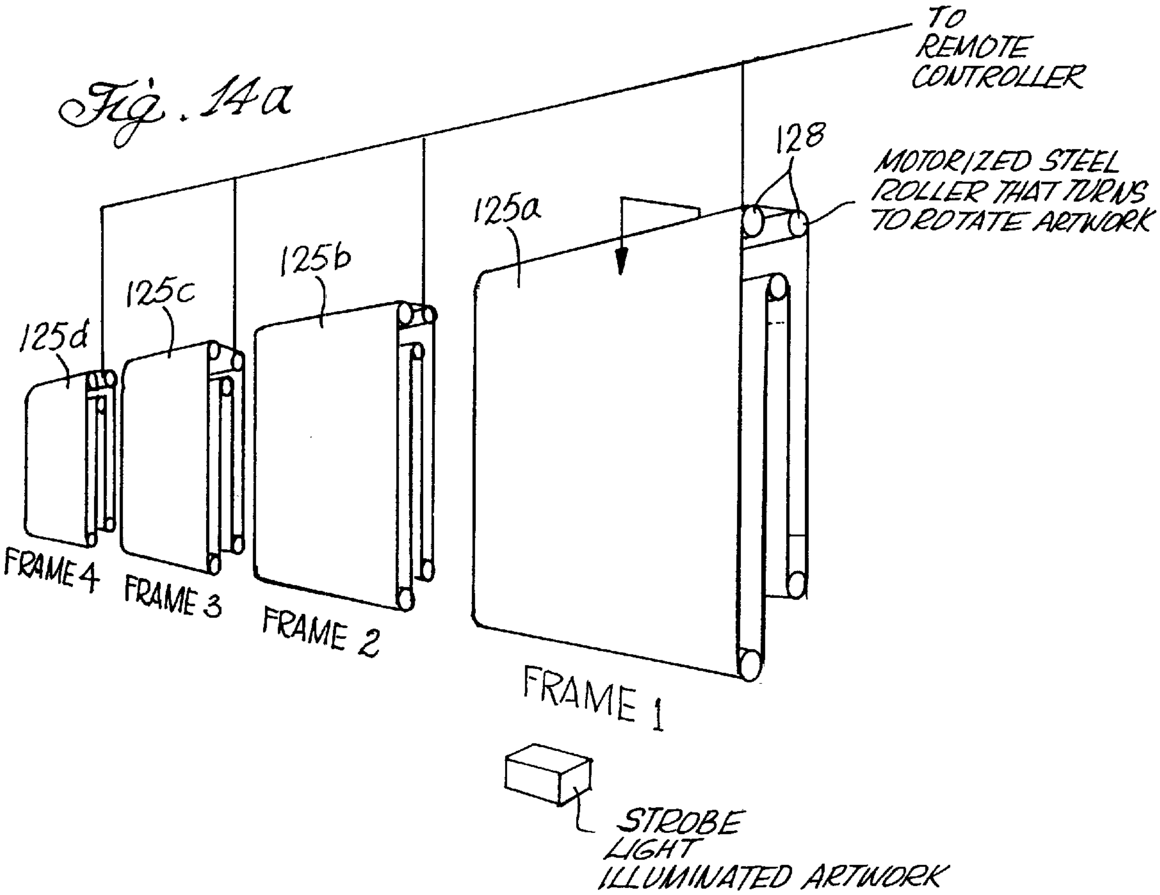
FIGS. 14*a* and 14*b* are views of an alternate embodiment of the present invention in which a remotely controllable scrolling system displays the artwork.
Figure 14B:
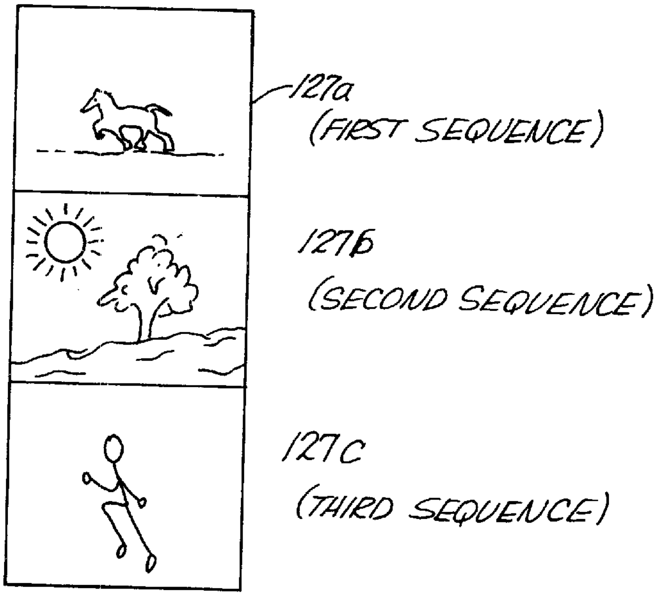

In yet another embodiment of the present invention, systems for changing the artwork are used to enable the presentation of different apparent motion visual displays. Referring to FIGS. 14*a* and 14*b*, the artwork is displayed on individual scrolls 125*a–d*. Each scroll contains three separate frames 127*a–c* for different apparent motion sequences. The entire animation sequence may be changed by vertically rolling the scrolls to reveal the frames for a new sequence. In the preferred embodiment, the scrolls are housed on motorized steel rollers 128 or other suitable means coupled to a remote controller for enabling remote rotation of the scrolls. The artwork on the scrolls is lit sequentially by strobe lights as described above.

Figure 15:
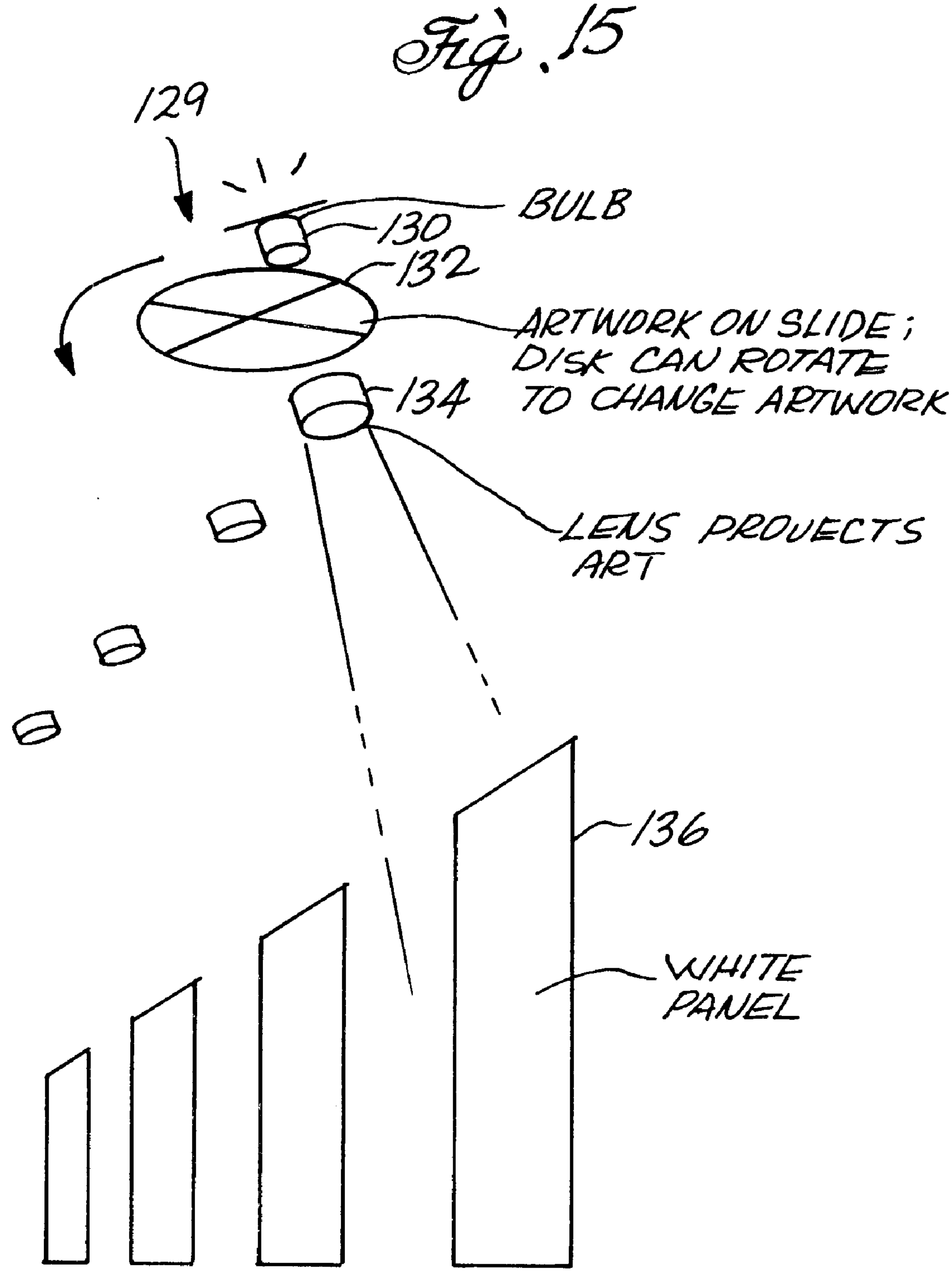
FIG. 15 is a view of another embodiment of the present invention in which a remotely controllable stroboscopic slide projection system displays the artwork.

Referring to FIG. 15, in another embodiment of the present invention that enables remote alteration of the apparent motion visual display sequences, a series of slide projectors 129 are mounted at equal distances from one another on or adjacent the tunnel wall or floor, and each one projects a different image corresponding to an artwork frame on a white panel 136. Alternatively, the tunnel walls can be painted a suitable color for displaying the projected images. A sensor (FIG. 11) mounted to each railcar triggers the slide projector bulb to flash for a brief period, projecting the image through a lens on the slide onto the panel. As a result of projection from an angle, anamorphic lenses 134 are used to compensate for distortion of the projected image. To further enhance the system, the slides can be placed in a rotatable slide tray 132 which is remotely controllable to rotate a different set of slides to reveal a new sequence of artwork frames for changing the visual display.

Figure 16:
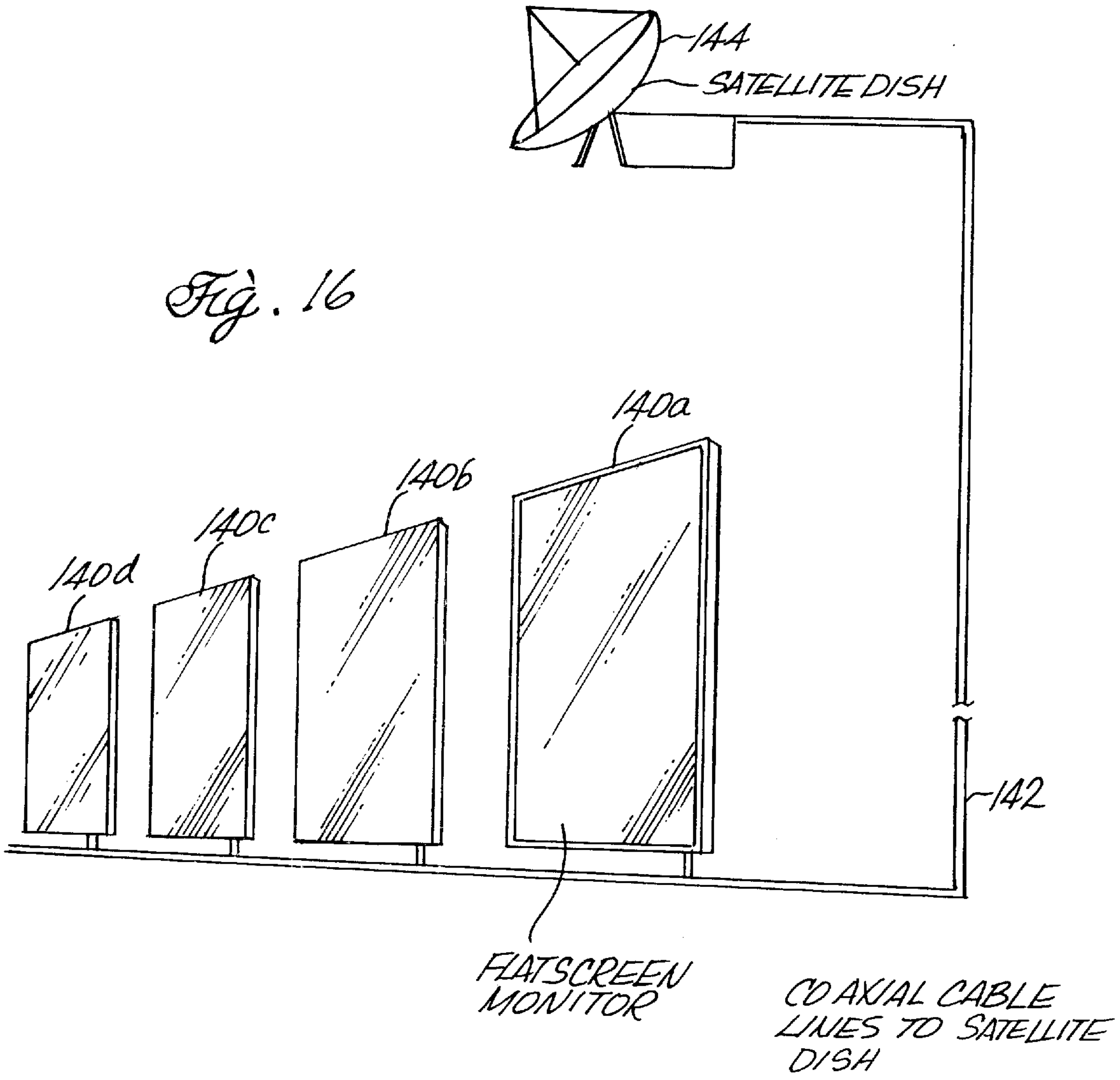
FIG. 16 is still another embodiment of the present invention in which remotely controllable electronic monitors display the artwork.

Referring to FIG. 16, the artwork frames are displayed from a series of flat screen monitors 140*a–d*, such as LED, LCD or digital displays, connected in series along the tunnel wall. The monitors are mounted at equal distances apart and each one shows a different image of artwork. A sensor (FIG. 11) mounted to each train car, triggers the monitor to display an image for a brief period. The sequential illumination of these monitors creates the illusion of the apparent motion visual display. In an exemplary embodiment, the monitors are three quarters of an inch thick and connected by one or more coaxial cables 142 linking the monitors to a satellite dish 144. The satellite dish can be used to deliver images for the monitors from a central location from which all of the artwork could be changed instantly at any time. This system allows virtually instant changing of artwork and centralized control of apparent motion visual displays in tunnels at any global location. Suitable monitors are available from Sony Corp., 3M Corp. and Sharp Electronics Corp.

Figure 17:
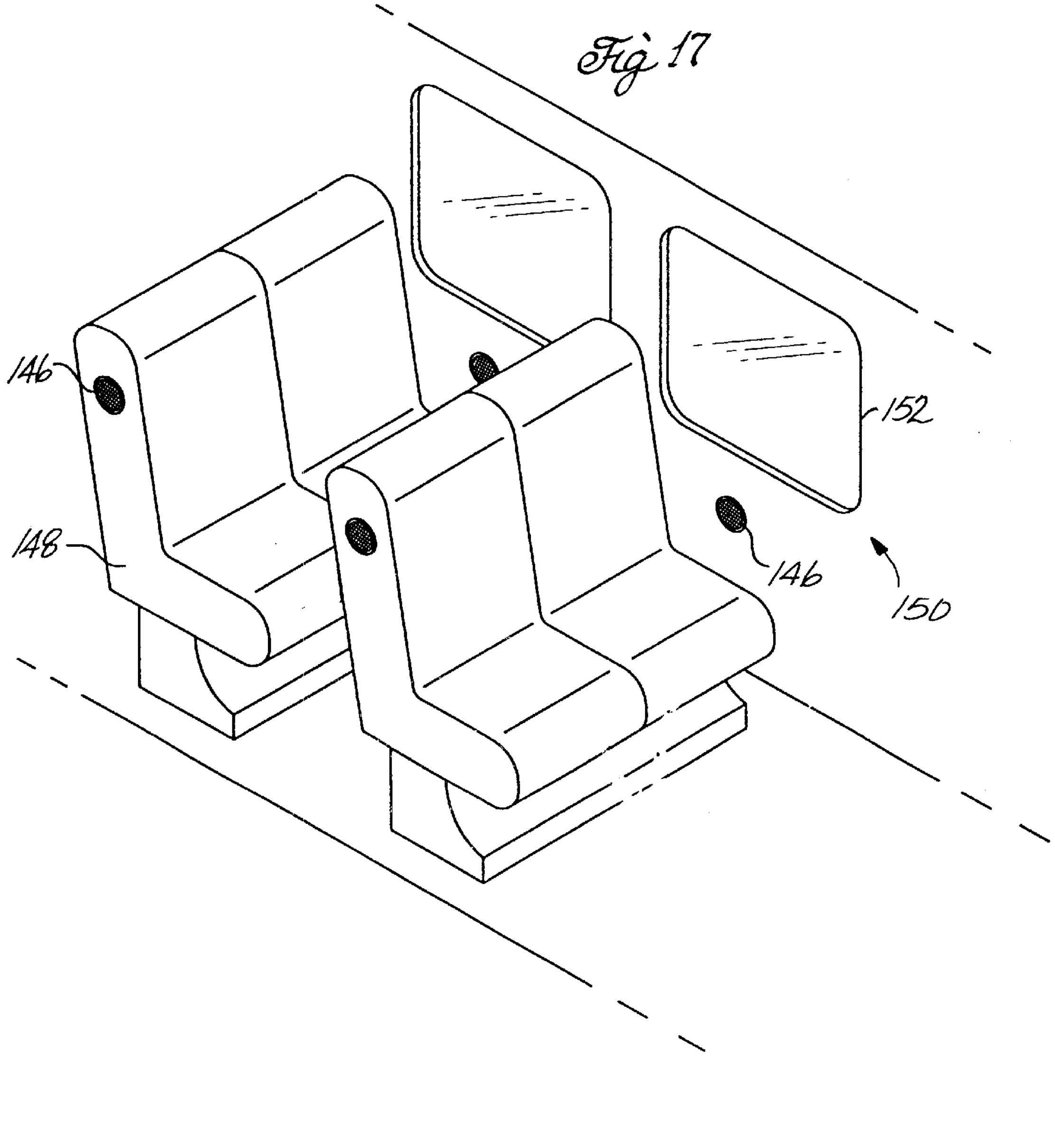
FIG. 17 is a perspective diagram illustrating an exemplary placement of speakers within the railcar for implementing a soundtrack to accompany the apparent motion visual display.
Figure 18:
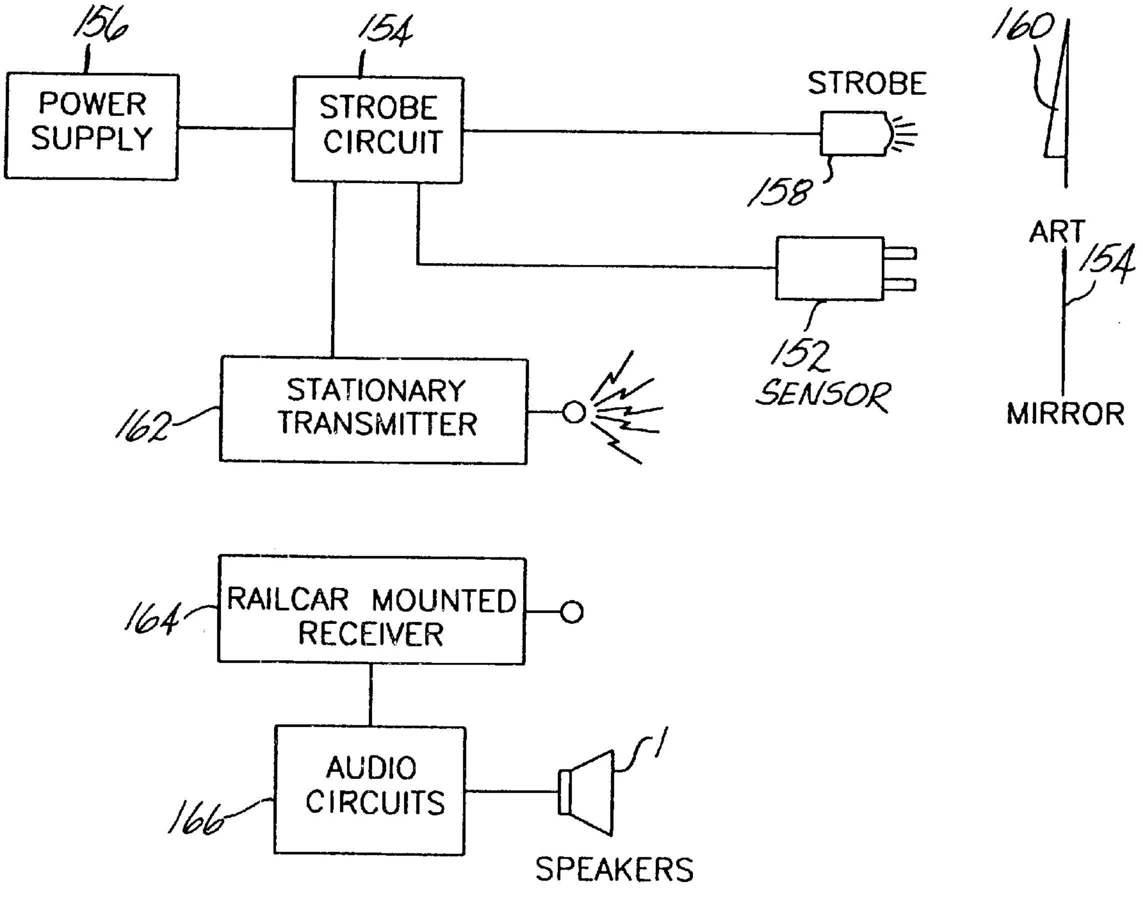
FIG. 18 is a block diagram of a circuit for implementing a soundtrack for the apparent motion visual display.

To enhance the apparent motion visual displays, the present invention also enables a soundtrack for complimenting the display. The soundtrack can be broadcast, for example, through radio transmission, internal speakers, or any other suitable means. FIG. 17 shows a sample arrangement of speakers 146 on a passenger seat 148 and interior railcar wall 150. The soundtrack could also be broadcast over individual headphones or over a car's public address system. Referring to FIG. 18, a block diagram is shown illustrating one system for coordinating the soundtrack with the artwork being illuminated. Coordination is achieved by timing the audio system using the same method used to time the flashing of the artwork. Sensor 152 emits an infrared light beam or other signal which reflects from a mirror on the passing train. The reflected beam is detected by the sensor, which in turn sends a signal to the strobe circuit 154 which enables power from the power supply 156 to cause the strobe light 158 to flash, thereby illuminating the artwork 160. At the same time, the strobe circuit delivers a signal to a stationary transmitter 162 for transmitting radio waves to a railcar mounted receiver 164. The receiver is connected to suitable audio circuits for producing the desired sound through speakers 146 located within the railcar. By coupling the sound to the triggering of the strobe lights, each segment of the soundtrack is played at the correct time.

Figure 19:
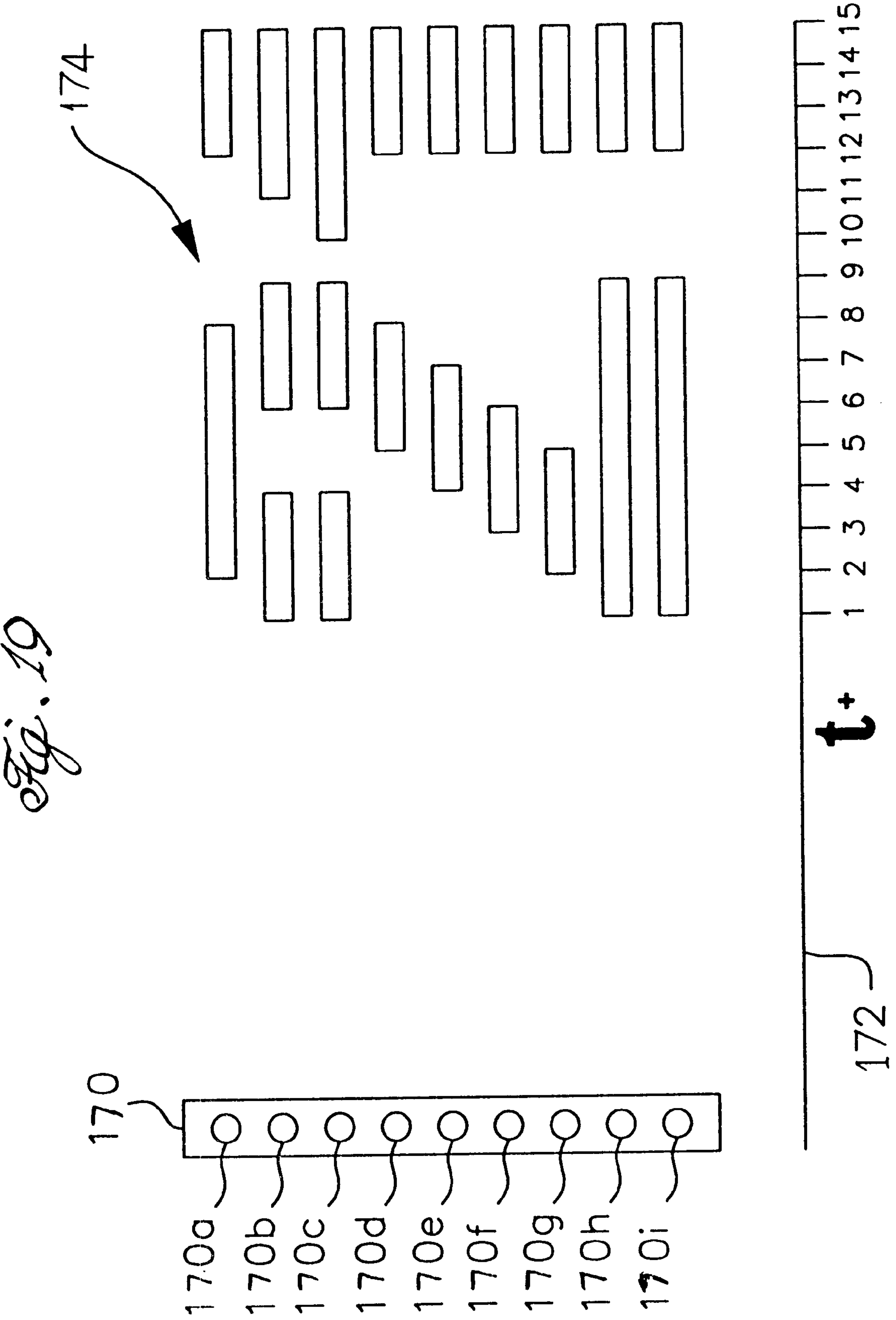
FIG. 19 is an alternate embodiment of the present invention involving systematically illuminating vertical strips of light bulbs.
Figure 20:
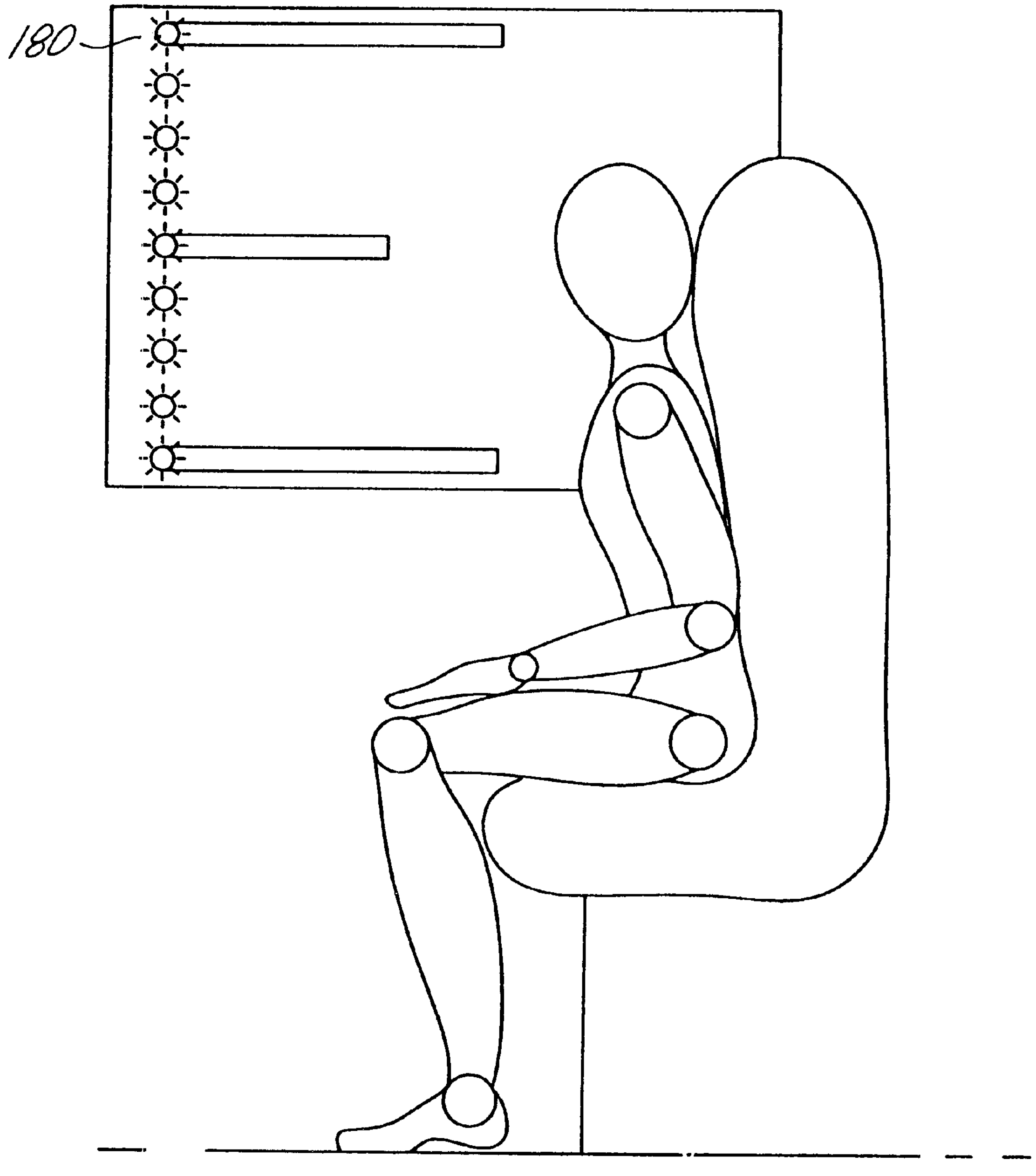
FIG. 20 is a perspective view of a passenger on a railcar observing the active vertical strips of light bulbs according to the embodiment of FIG. 19.

Referring to FIG. 19, another aspect of this invention involves a visual display that is dependant on the motion of the viewer but does not use individual frames of artwork. Instead, it involves a series of vertical light bulb strips which illuminate in a programmed manner to form letters, typographic characters or other graphics that are only perceptible to the moving viewer. The longer an image is illuminated the more blurred it appears to a moving viewer; if a single bulb is illuminated long enough it appears to be a line of light instead of a solitary bulb. A vertical strip of bulbs 170 is shown relative to a time axis 172. At t=1 four bulbs, 170*b*, 170*c*, 170*h* and 170*i* turn on. As the viewer moves past the bulbs, he or she sees strips of light, the length of which is determined by the length of time the bulb is illuminated. At t=3 the bulbs 170*b* and 170*c* turn off forming short strips of light. The lower bulbs 170*h* and 170*i* remain illuminated until t=9 forming longer strips of light. Each of the other bulbs light is programmed to illuminate at various times between t=0 to t=15 to form the number "21" 174. Due to the sensitivity of the human eye these time increments are very short and do not depend on the speed of the railcar, but each strip of lights can be controlled by the systems of FIGS. 4–7 to turn off/on or to change its respective message. FIG. 20 shows a vertical strip displaying the letter "E" 180 as observed by a railcar passenger.

This form of visual display can be varied with other features such as colored bulbs or tinted windows and can also be combined with the previous embodiments involving frames of artwork and a soundtrack to create a complete display system.

It will be understood to those skilled in the art that the foregoing is merely illustrative of the principles of the invention, and that various modifications can be made without departing from the spirit and scope of the invention as defined by the following claims. For example, this invention is not limited to railcars in tunnels. The same principles described in the context of the present invention can also be adapted to elevators, buses, people movers or other forms of transportation.

What is claimed is:

1. Apparatus for presenting apparent motion visual displays, the apparatus comprising:

a surface;

artwork arranged in a sequence on the surface;

an object moving relative to the surface; and means for presenting the artwork wherein an observer on the moving object sees a visual display in which the artwork has apparent motion, wherein the means for presenting the artwork comprises:

a first section of artwork displays;

a second section of artwork displays on a same side of the surface as the first section of artwork displays;

a first set of lights for illuminating the first section of artwork displays;

a second set of lights for illuminating the second section of artwork displays;

a first sensor for detecting when the observer is opposite one of the displays in the first section of artwork displays;

a second sensor for detecting when the observer is opposite one of the displays in the second section of artwork displays; and means for controlling the first and second set of lights wherein the first set of lights is activated only when the observer is opposite one of the artwork displays in the first section and the second set of lights is activated only when the observer is opposite one of the artwork displays in the second section.

2. The apparatus of claim 1 wherein the means for presenting the artwork comprises:

an artwork proximity sensor for determining when the object is opposite the artwork;

means for illuminating the artwork; and a control circuit coupled to the artwork proximity sensor and the illuminating means for activating the illuminating means to illuminate the artwork as the object passes by the artwork.

3. The apparatus of claim 2 wherein the artwork proximity sensor comprises:

an infrared sensor coupled to the surface adjacent the artwork; and a reflector attached to the object, wherein the infrared sensor emits an infrared beam and the reflector reflects the beam back toward the sensor as the object passes the sensor.

4. The apparatus of claim 2 further comprising means for producing accompanying sound comprising:

a radio transmitter coupled to the control circuit for transmitting radio waves upon activation by the control circuit; and a receiver attached to the object for receiving the radio waves and transforming the radio waves to sound.

5. The apparatus of claim 1 wherein the artwork comprises:

a plurality of scrolls, each scroll mounted on one or more rotatable wheels, each scroll displaying a plurality of frames of artwork;

a motor coupled to the rotatable wheels for moving the scroll; and remote control means coupled to the motors for enabling an operator to select the frames that are displayed.

6. The apparatus of claim 1 wherein the means for presenting the artwork comprises:

a plurality of slide projectors, each projector for displaying one or more artwork images on the surface, the projector including;

means for displaying one of a plurality of slides;

an anamorphic lens coupled to the displaying means for compensating for any distortion in the images; and means for remotely controlling the slide projector to selectively display one of the plurality of slides.

7. The apparatus of claim 1 wherein the means for presenting the artwork comprises:

a plurality of electronic monitors, each monitor for displaying one or more artwork images;

a central control station; and a remote link coupled between the electronic monitors and the central control images for enabling an operator to electively display one of the plurality of images.

8. The apparatus of claim 7 wherein the remote link comprises a satellite dish.

9. The apparatus of claim 1 wherein the means for presenting the artwork comprises means for alternately illuminating artwork displays arranged in a sequence along the surface, wherein adjacent artwork displays are never illuminated at the same time.

10. The apparatus of claim 1 wherein the means for presenting the artwork comprises:

means for producing a continuous beam of light; and a reflector mounted on the object and positioned to reflect the beam of light from on to the artwork as the object passes the artwork.

11. An apparatus for presenting apparent motion visual displays, the apparatus comprising:

a surface;

an object moving relative to the surface; and means for presenting a plurality of images on the surface, wherein a first image and a second image are presented adjacent to each other on the surface; and wherein the first image and the second image are presented at a different period of time on the surface based upon a position of the moving object relative to the first image and the second image;

whereby an observer on the moving object is presented the images on the surface such that the first image and the second image are part of a visual display in which the images have apparent motion, and wherein the means for presenting the images comprises:

a first section of image displays, which includes the first image;

a second section of image displays, which includes the second image on a same side of the surface as the first section of image displays;

a first set of presenting means for presenting the first section of image displays on the surface;

a second set of presenting means for presenting the second section of image displays on the surface;

a first sensor for detecting when the observer is opposite one of the image displays in the first section;

a second sensor for detecting when the observer is opposite one of the image displays in the second section; and means for controlling the first set and second set of presenting means wherein the first set of presenting means is activated only when the observer is opposite one of the image displays in the first section and the second set of presenting means is activated only when the observer is opposite one of the image displays in the second section;

whereby the observer views the first set of image displays and the second set of image displays as a single visual display having apparent motion.

12. The apparatus of claim 11 wherein the means for presenting the images on the surface is at least one slide projector that can be controlled to selectively display one of a plurality of slides.

13. The apparatus of claim 11 wherein the means for presenting the images on the surfaces is at least one electronic monitor that can be remotely coupled to a central control station for allowing an operator to selectively display the images on the monitor.

14. Apparatus for presenting apparent motion visual displays, the apparatus comprising:

a surface;

artwork arranged in a sequence on the surface;

an object moving relative to the surface;

means for presenting the artwork wherein an observer on the moving object sees a visual display in which the artwork has apparent motion;

wherein the means for presenting the artwork comprises means for alternately illuminating artwork displays arranged in a sequence along the surface, comprising:

a first section of artwork displays;

a second section of artwork displays;

a first set of lights for illuminating the first section of artwork displays;

a second set of lights for illuminating the second section of artwork displays;

a first sensor for detecting when the observer is opposite one of the displays in the first section of artwork displays;

a second sensor for detecting when the observer is opposite one of the displays in the second section of artwork displays; and means for controlling the first and second set of lights wherein the first set of lights is activated only when the observer is opposite one of the artwork displays in the first section and the second set of lights is activated only when the observer is opposite one of the artwork displays in the second section.

15. The apparatus of claim 14 wherein adjacent artwork displays are not illuminated at the same time.

* * * * *